United States Patent
Lawson et al.

(10) Patent No.: US 8,522,437 B2
(45) Date of Patent: Sep. 3, 2013

(54) METHOD FOR TIRE AND WHEEL ASSEMBLY UTILIZING A TIRE INFLATING SUB-STATION

(75) Inventors: Lawrence J. Lawson, Troy, MI (US); Robert Reece, Clarkston, MI (US); Lawrence L. Reece, Warren, MI (US); Richard J. Standen, Grosse Ile, MI (US)

(73) Assignee: Android Industries LLC, Auburn Hills, MI (US)

( * ) Notice: Subject to any disclaimer, the term of this patent is extended or adjusted under 35 U.S.C. 154(b) by 0 days.

(21) Appl. No.: 13/400,044

(22) Filed: Feb. 18, 2012

(65) Prior Publication Data
US 2012/0144673 A1 Jun. 14, 2012

Related U.S. Application Data

(62) Division of application No. 12/236,162, filed on Sep. 23, 2008, now Pat. No. 8,161,650.

(60) Provisional application No. 60/976,964, filed on Oct. 2, 2007, provisional application No. 61/054,988, filed on May 21, 2008.

(51) Int. Cl.
*B60C 25/02* (2006.01)
*B66C 1/54* (2006.01)

(52) U.S. Cl.
USPC .............. 29/894.31; 29/429; 29/430; 29/783; 29/791; 157/16; 294/94

(58) Field of Classification Search
USPC .............. 29/894.31, 429, 430, 783, 791, 799, 29/802; 157/16, 21, 1.1, 1; 294/94, 96; 901/31; 483/901
IPC ........... B60C 25/132, 25/05, 25/00; B66C 1/54, B66C 1/42; B27H 7/00
See application file for complete search history.

(56) References Cited

U.S. PATENT DOCUMENTS

| | | |
|---|---|---|
| 3,280,880 A | 10/1966 | Ericson et al. |
| 3,651,849 A | 3/1972 | Kaminskas |
| 3,658,109 A | 4/1972 | Kaminskas et al. |
| 4,279,438 A | 7/1981 | Singh |

(Continued)

FOREIGN PATENT DOCUMENTS

| | | |
|---|---|---|
| CN | 1333716 A | 1/2002 |
| DE | 102005001212 | 7/2006 |

(Continued)

OTHER PUBLICATIONS

English translation of DE 102005001212 A1 obtained from Espace.net on Dec. 5, 2012.*

(Continued)

*Primary Examiner* — David Bryant
*Assistant Examiner* — Jason L Vaughan
(74) *Attorney, Agent, or Firm* — Honigman Miller Schwartz and Cohn LLP

(57) ABSTRACT

An apparatus for assembling a tire and a wheel is disclosed. The apparatus includes a single-cell workstation including a device that retains a wheel, and a plurality of sub-stations. The device moves the wheel to each of the plurality of sub-stations, without releasing the wheel, to assemble a tire-wheel assembly. A method is also disclosed.

8 Claims, 37 Drawing Sheets

(56) References Cited

U.S. PATENT DOCUMENTS

| | | | |
|---|---|---|---|
| 4,789,015 | A | 12/1988 | Flinn |
| 4,834,159 | A * | 5/1989 | Burger .............................. 157/1 |
| 4,955,653 | A | 9/1990 | Beals |
| 5,035,274 | A * | 7/1991 | Kinnick et al. ................. 157/1.1 |
| 5,072,765 | A | 12/1991 | Kane et al. |
| 5,878,801 | A | 3/1999 | Ellis |
| 6,138,737 | A * | 10/2000 | Bocquet et al. .............. 157/1.22 |
| 6,148,892 | A | 11/2000 | Koerner et al. |
| 6,176,288 | B1 | 1/2001 | Kane et al. |
| 6,463,982 | B1 | 10/2002 | Doan |
| RE39,312 | E | 10/2006 | Kane et al. |
| 2007/0000616 | A1 | 1/2007 | Rogalla et al. |
| 2007/0074823 | A1 | 4/2007 | Reece et al. |
| 2008/0277072 | A1 | 11/2008 | Hagiwara |

FOREIGN PATENT DOCUMENTS

| | | | |
|---|---|---|---|
| DE | 102006001212 A1 | | 7/2006 |
| EP | 0343426 A1 | | 11/1989 |
| EP | 981453 B1 | * | 9/2002 |
| EP | 1671820 | | 6/2006 |
| EP | 1738937 | | 1/2007 |
| JP | 10278521 A | | 10/1998 |
| JP | 2001527482 W | * | 12/2001 |
| JP | 2011148395 A | | 8/2011 |
| WO | WO-9852781 | | 11/1998 |
| WO | WO-2004/035331 | | 4/2004 |
| WO | WO-2011143175 A2 | | 11/2011 |

OTHER PUBLICATIONS

Office Action from European Patent Office for Application 11 177 724.9 dated Jul. 31, 2012.

"Premier Event Broadens its Scope", Automotive Manufacturing Solutions, Jul./Aug. 2006.

Office Action from Canadian Patent Office dated Feb. 18, 2010 for Application 2,640,011.

Office Action from Chinese Patent Office for Application 200810190829.7 dated Jun. 21, 2010.

Office Action from Canadian Patent Office for Application 2,640,011 dated Apr. 12, 2011.

Japanese Office Action dated Sep. 6, 2011 for Application 2008-257810.

Japanese KOKAI Publication No. S58-34732.

Japanese Patent Application KOKAI publication No. H7-47823.

EP Search Report for EP Application No. 11177717.3 dated Nov. 24, 2011.

Office Action dated Jun. 8, 2011 for U.S. Appl. No. 12/236,162.

International Search Report for Application No. PCT/US2012/049717 dated Jan. 31, 2013.

* cited by examiner

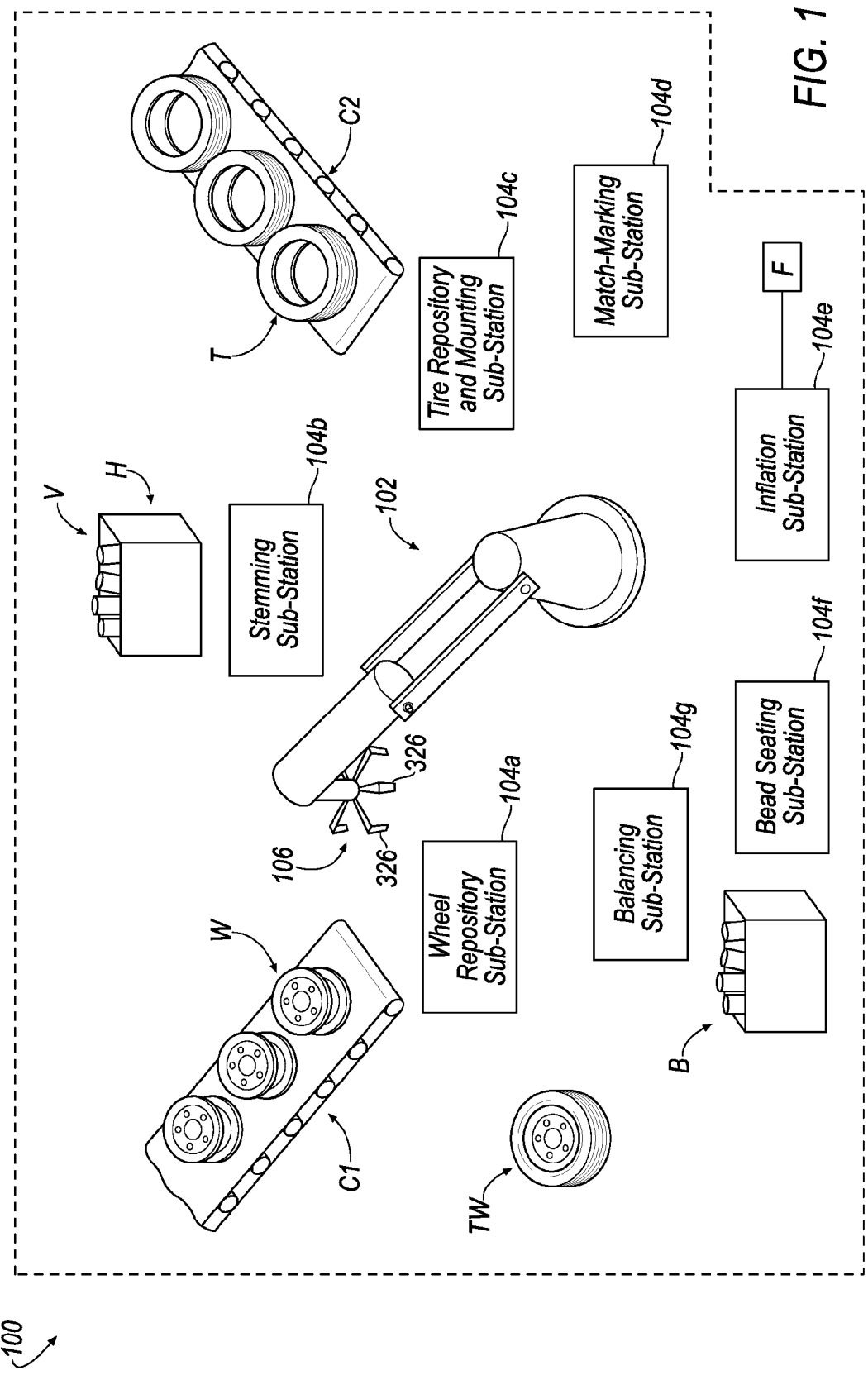

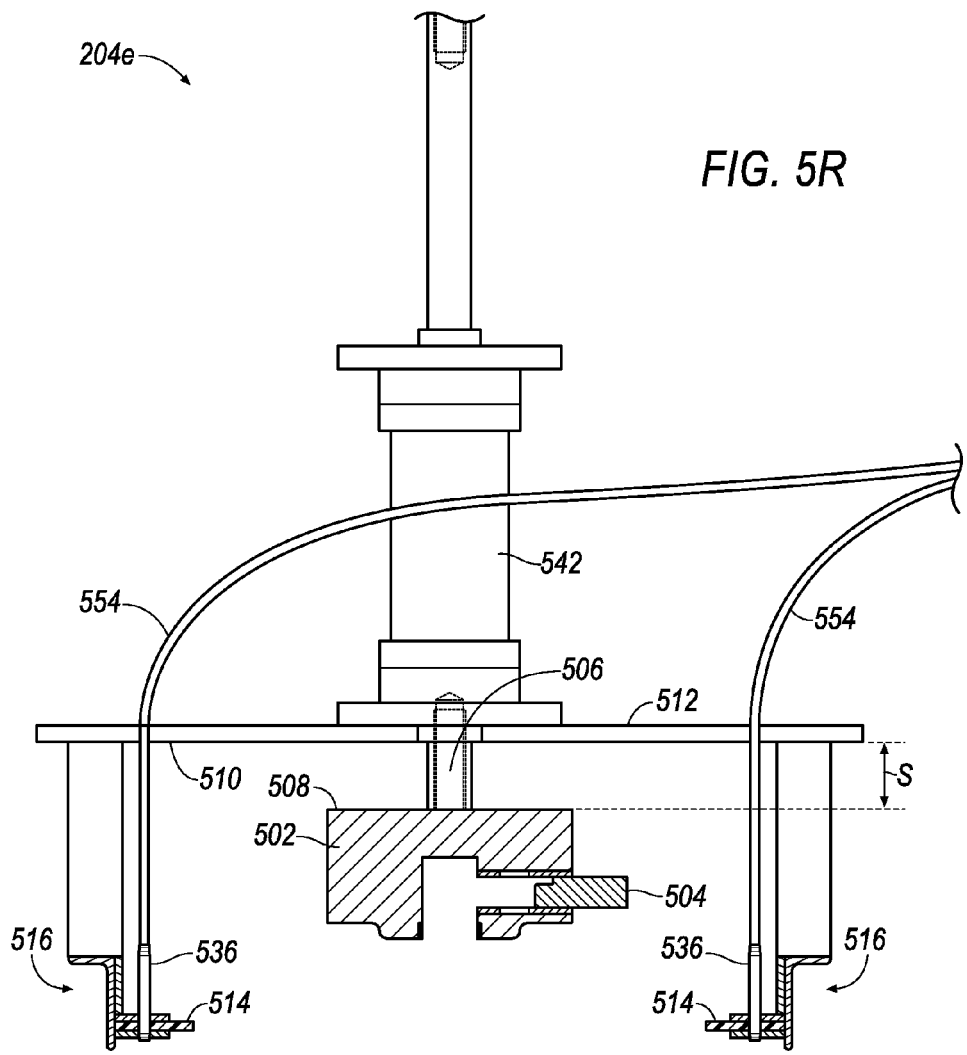
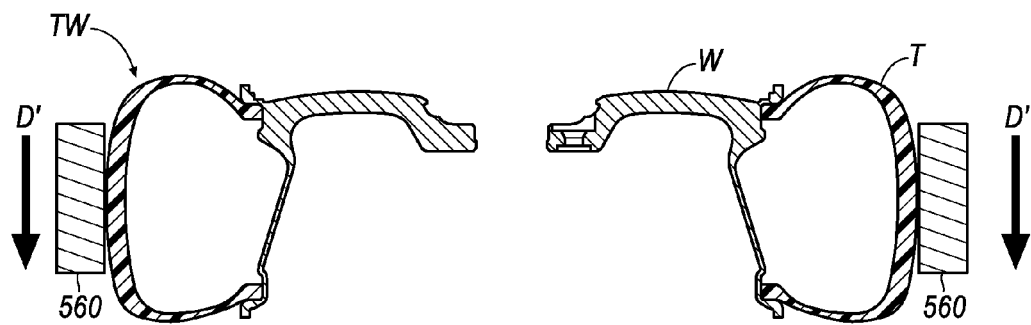
FIG. 5R

//<sub>US 8,522,437 B2</sub>//

METHOD FOR TIRE AND WHEEL ASSEMBLY UTILIZING A TIRE INFLATING SUB-STATION

RELATED APPLICATION

This application claims the benefit of U.S. Ser. No. 12/236,162 filed Sep. 23, 2008 (now U.S. 8,161,650 issued on Apr. 24, 2012), which claims priority to U.S. Provisional Patent Application Ser. Nos. 60/976,964 filed on Oct. 2, 2007 and 61/054,988 filed on May 21, 2008, the contents of which are fully incorporated herein by reference.

FIELD OF THE INVENTION

The disclosure relates to tire-wheel assemblies and to a system and method for assembling a tire and a wheel.

DESCRIPTION OF THE RELATED ART

It is known in the art to assemble a tire and a wheel in several steps. Usually, conventional methodologies that conduct such steps require a significant capital investment and human oversight. The present invention overcomes drawbacks associated with the prior art by setting forth a simple system and method for assembling a tire and a wheel together.

BRIEF DESCRIPTION OF THE DRAWINGS

The disclosure will now be described, by way of example, with reference to the accompanying drawings, in which:

FIG. 1 is an environmental view of a single-cell workstation for assembling a tire and a wheel in accordance with an exemplary embodiment of the invention;

DETAILED DESCRIPTION OF THE INVENTION

Figure 2A:
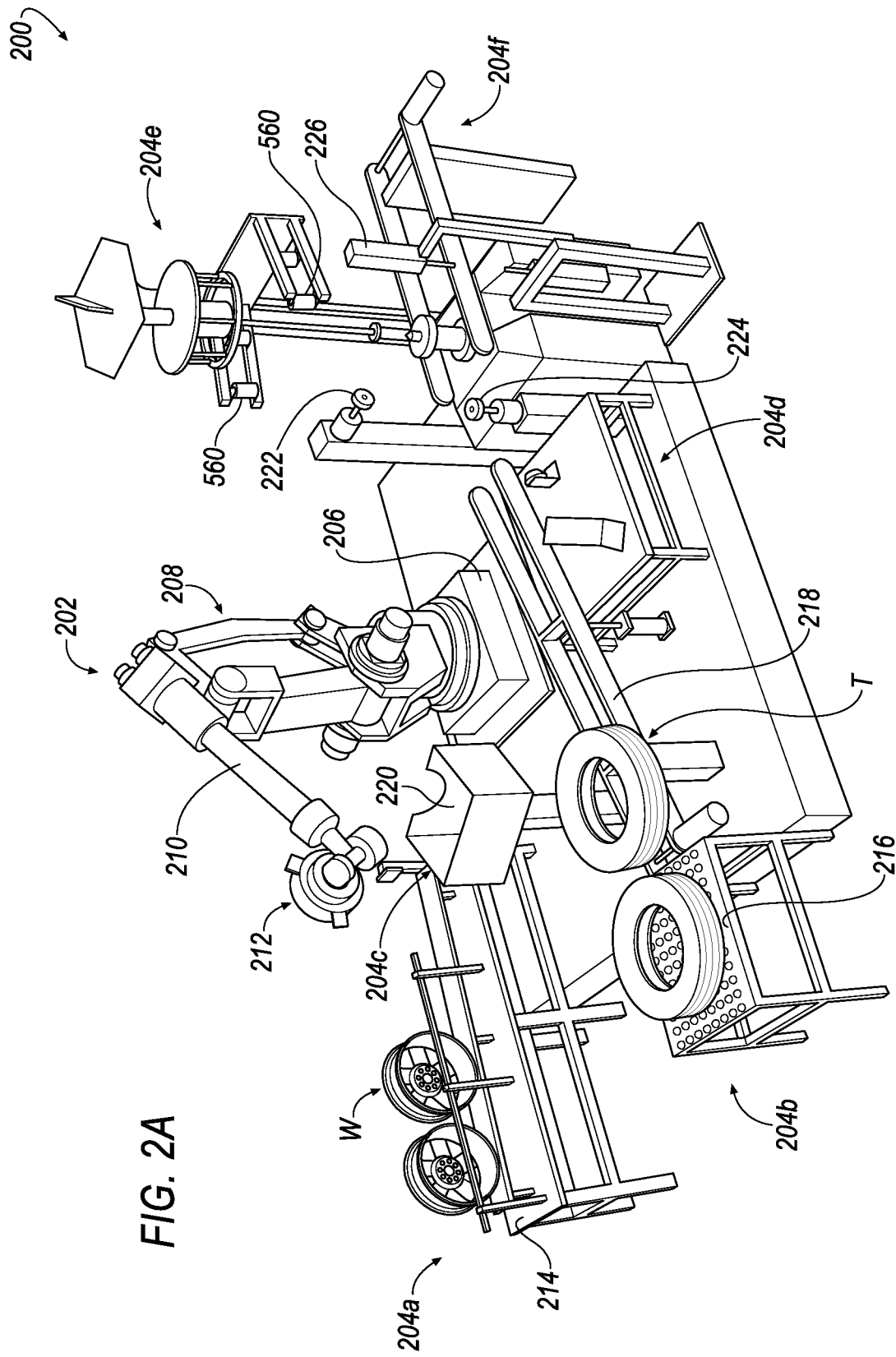
FIGS. 2A-J illustrate environmental views of a single-cell workstation for assembling a tire and a wheel in accordance with an exemplary embodiment of the invention.

The Figures illustrate an exemplary embodiment of an apparatus and method for assembling a tire and wheel in accordance with an embodiment of the invention. Based on the foregoing, it is to be generally understood that the nomenclature used herein is simply for convenience and the terms used to describe the invention should be given the broadest meaning by one of ordinary skill in the art.

In an embodiment, the systems shown at FIGS. 1 and 2A-2J may be referred to as "single-cell" workstations 100, 200. In the forgoing disclosure, it will be appreciated that term "single-cell" indicates that the workstation 100, 200 produces a tire-wheel assembly, TW, without requiring a plurality of successive, discrete workstations that may otherwise be arranged in a conventional assembly line such that a partially-assembled tire-wheel assembly is "handed-off" along the assembly line (i.e., "handed-off" meaning that an assembly line requires a partially-assembled tire-wheel assembly to be retained by a first workstation of an assembly line, worked on, and released to a subsequent workstation in the assembly line for further processing).

Rather, the single cell workstation 100, 200 provides one workstation having a plurality of subs-stations 104a-104g, each performing a specific task in the process of assembling a tire and a wheel, TW. This assembling process takes place wherein the tire and/or wheel "handing-off" is either minimized or completely eliminated. As such, the novel single-cell workstation 100, 200 significantly reduces the cost and investment associated with owning/renting the real estate footprint associated with a conventional tire-wheel assembly line while also having to provide maintenance for each individual workstation defining the assembly line. Thus, capital investment and human oversight is significantly reduced when a single cell workstation 100, 200 is employed in the manufacture of tire-wheel assemblies, TW.

Referring to FIG. 1, a system for assembling a tire and a wheel, TW, is shown generally at 100 according to an embodiment. The system 100 includes a device 102. In operation, the device receives and retains a wheel, W, which eventually comprises part of a tire-wheel assembly, TW. The ability of the device 102 to retain the wheel, W, throughout a portion of or the entire assembling process minimizes or eliminates the need to "hand-off" a partially assembled tire-wheel assembly to a subsequent workstation.

In operation, the device 102 is initialized to start the assembly operation at a first sub-station 104a where the device 102 receives and retains a wheel, W, thereto. The sub-station 104a is hereinafter referred to as a wheel repository sub-station.

The wheel, W, may be advanced toward the device 102 from a conveyor belt, C1, or alternatively, the device 102 may retrieve the wheel, W, from a bin, hopper, or the like (not shown).

As seen in FIG. 1, the device 102 may include a claw 106, gripper, or other means for securing the wheel, W. In an embodiment, throughout two or more assembly steps, the device 102 does not release the wheel, W, from the claw 106 until the tire-wheel assembly, TW, has been processed by two or more sub-stations 04a-104g. This approach minimizes or eliminates handing-off the tire-wheel assembly, TW, to subsequent workstations in the manufacturing process.

An embodiment for assembling a tire and a wheel, TW, with the single-cell workstation 100 is not provided in the foregoing description. Once the device 102 secures the wheel, W, thereto at wheel repository sub-station 104a, the device 102 is then advanced from the wheel repository sub-station 104a to a stemming sub-station 104b. At the stemming sub-station 104b, a valve stem, V, is retrieved from a bin, hopper, H, or the like and is inserted through a hole or passage formed in the wheel, W. The stemming sub-station 104b may include a stemming apparatus (not shown) that retrieves the valve stem, V, from the hopper, H, for subsequent insertion of the valve stem, V, through the hole or passage in the wheel, W.

Once the valve stem, V, is secured to the wheel, W, at sub-station 104b, the device 102, which includes the wheel, W, with the valve stem, V, attached thereto, is then advanced to a tire repository and mounting sub-station 104c. At the tire repository and mounting sub-station 104c, a tire, T, is retrieved from a repository including a conveyor belt, C2, bin, hopper, or the like. The tire, T, is then provided or otherwise joined about the circumference of the wheel, W, at the repository and mounting sub-station 104c. If desired, the tire repository and mounting sub-station 104c may include a device, such as, for example, rollers, that urge the tire, T, onto the wheel, W. Alternatively, the device 102 may urge the wheel, W, onto the tire, T. Specific aspects of the invention associated with the mounting of the tire, T, to the wheel, W, is shown and described in FIGS. 4A-4H.

Once the tire, T, is mounted to the wheel, W, at tire repository and mounting sub-station 104c, the device 102 is then advanced to a match-marking sub-station 104d. At the match-marking sub-station, 104d, the high point of radial force variation of the tire, T, and the low point of the radial run-out of the wheel, W, are located and respectively marked. The marks may be temporary or permanent. Then, the marking on each of the tire, T, and wheel, W, are angularly offset from one-another by approximately 180° to minimize force variations and/or imbalance of the tire-wheel assembly, TW.

Once the tire, T, and wheel, W, are match-marked at sub-station 104d, the device 102 is then advanced to an inflation sub-station 104e. At the inflation sub-station 104e, in an embodiment, a source of high pressure fluid, F, is provided for communication with the valve stem, V, mounted in the wheel, W. Once in communication with the valve stem, V, fluid from the source of high pressure fluid, F, flows through the valve stem, V, so as to inflate the tire, T, that is joined to the wheel, W. Although it is described above that inflation of the tire-wheel assembly, TW, is provided by way of the valve stem, V, it will be appreciated that the tire-wheel assembly, TW, may be inflated in another manner. In an embodiment, specific aspects of the invention associated with the inflating of the tire-wheel assembly, TW, is shown and described, for example, in FIGS. 5A-5R.

Once inflated, as desired, at the inflation sub-station 104e, the device 102 is advanced to a bead seating sub-station 104f. At the bead seating sub-station 104f, the beads of the tire, T, are positively seated against respective bead seats (not shown) of the wheel, W, such that air bubbles, contaminates, and the like that may be disposed or trapped between the tire bead and the bead seat are removed therefrom.

After the tire beads are seated in the wheel bead seats at the beat seating sub-station 104f, the device 102 is advanced to a balancing sub-station 104g. At the balancing sub-station 104g, the tire-wheel assembly, TW, is statically or dynamically balanced by applying correction weights, B, to the outer and inner flange of the wheel, W, to reduce the imbalance effect of the tire-wheel assembly, TW.

Although the single-cell workstation 100 is shown to include sub-stations 104a-104g, it will be appreciated that the arrangement and number of sub-sub-stations 104a-104g are not limited to that as shown in the illustrated embodiment. For example, it will be appreciated that the inflating sub-station 104e may precede the match-marking sub-station 104d.

Further, it will be appreciated that the single-cell workstation 100 may include fewer sub-stations 104a-104g than those that are shown in the illustrated embodiment. For example, the stemming sub-station 104b may be eliminated such that the wheel repository sub-station 104a may include wheels, W, that are already pre-stemmed.

Referring now to FIGS. 2A-2J, a single-cell workstation for assembling a tire and a wheel, TW, is shown generally at 200 according to an embodiment. The single-cell workstation 200 includes a device 202 that cooperates with a plurality of sub-stations 204a-204f that each perform a specific task in the process of assembling a tire and a wheel, TW.

As seen in FIG. 2A, the device 202 in the single-cell workstation 200 may include a robotic arm 202 that is located in a substantially central position relative the plurality of substations 204a-204f arranged on a real estate footprint. In FIG. 2A, the robotic arm 202 is shown in an at-rest, idle position. The robotic arm 202 may include, for example, a base portion 206, a body portion 208 connected to the base portion 206, an arm portion 210 connected to the body portion 208 and a claw portion 212 connected to the arm portion 210.

The body portion 208 is rotatably-connected to the base portion 206 such that the body portion 208 may be pivoted 360° relative the base portion 206. Further, the body portion 208 may be generally hinged to the base portion 206 having, for example, hinged, scissor-style arms such that the body portion 208 may be articulated vertically upward or downward relative the base portion 206.

The arm portion 210 is connected to the body portion 208 such that the arm portion 210 may be articulated in any desirable upward or downward position relative the body portion 208. Similar to the rotatable connection of the base portion 206 and body portion 208, the claw portion 212 may be rotatably-connected to the arm portion 210 such that the claw portion 212 may be pivoted 360° relative the arm portion 210. Movements of the portions 208-212 may be controlled manually with a joystick (not shown), or, alternatively, automatically by way of logic stored on a controller having a processor (not shown).

In the following description, it will be appreciated that prescribed movements of the body portion 208 relative the base portion 206 may have occurred before, during or after a described movement of the arm portion 210 and/or claw portion 212. For example, the body portion 208 may have been rotated, articulated or the like in order to locate the arm and claw portions 210, 212 in a desired position at or proximate a particular sub-station 204a-204e.

Still referring to FIG. 2A, a plurality of wheels, W, are shown disposed at a wheel repository sub-station 204a. According to an embodiment, the wheel repository sub-station 204a is illustrated to include, for example, a rack 214; however, it will be appreciated that the wheel repository sub-station 204a may include an endless conveyor or the like.

Further, as seen in FIG. 2A, a plurality of tires, T, are shown at a tire repository sub-station 204b. According to an embodiment, the tire repository sub-station 204b includes a rack 216 and conveyor device 218. However, it will be appreciated that the wheel repository sub-station 204b may include an endless conveyor or the like.

Figure 2B:
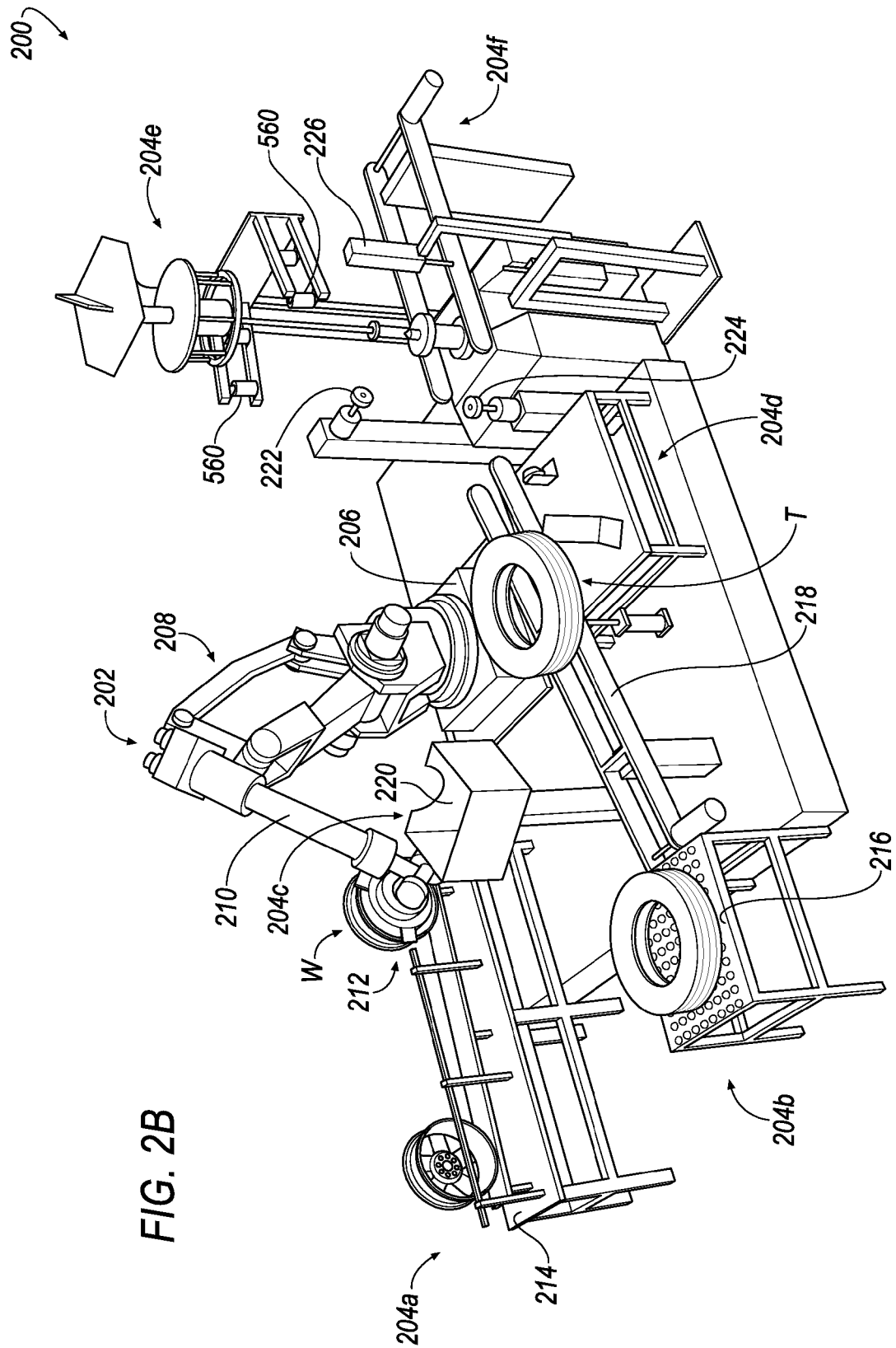

Referring now to FIG. 2B, the arm portion 210 has been articulated such that the claw portion 212 is moved from the idle position proximate the wheel repository sub-station 204a. As shown in FIG. 2B, a wheel, W, has been advanced to a loading position near a terminal end of the rack 214 proximate claw portion 212 that has been articulated to a wheel-receiving positioning. Advancement of the wheel, W, to the terminal end of the rack 214 may be provided by a conveyor, or, alternatively, by gravity, if, for example, the rack 214 is positioned on a downward incline. Further, it will be appreciated that if the wheel repository sub-station 204a includes a bin (not shown) or the like rather than a rack 214, no advancement of a wheel, W, is provided and the claw portion 212 may locate and be subsequently positioned proximate a wheel, W, that is located within the bin.

Still referring to FIG. 2B, the claw portion 212 is shown to be positioned proximate the wheel, W, such that the wheel, W, may be secured to the claw portion 212. In an embodiment, the claw portion 212 is interfaced with the wheel, W, by engaging an inner diameter, $D_{IW}$ (FIGS. 3C-3E), of the wheel, W. However, it will be appreciated that the interfacing of the claw portion 212 and wheel, W, may be conducted in any desirable manner and is not limited to the engagement of an inner diameter, $D_{IW}$, of the wheel, W.

Figure 3A:
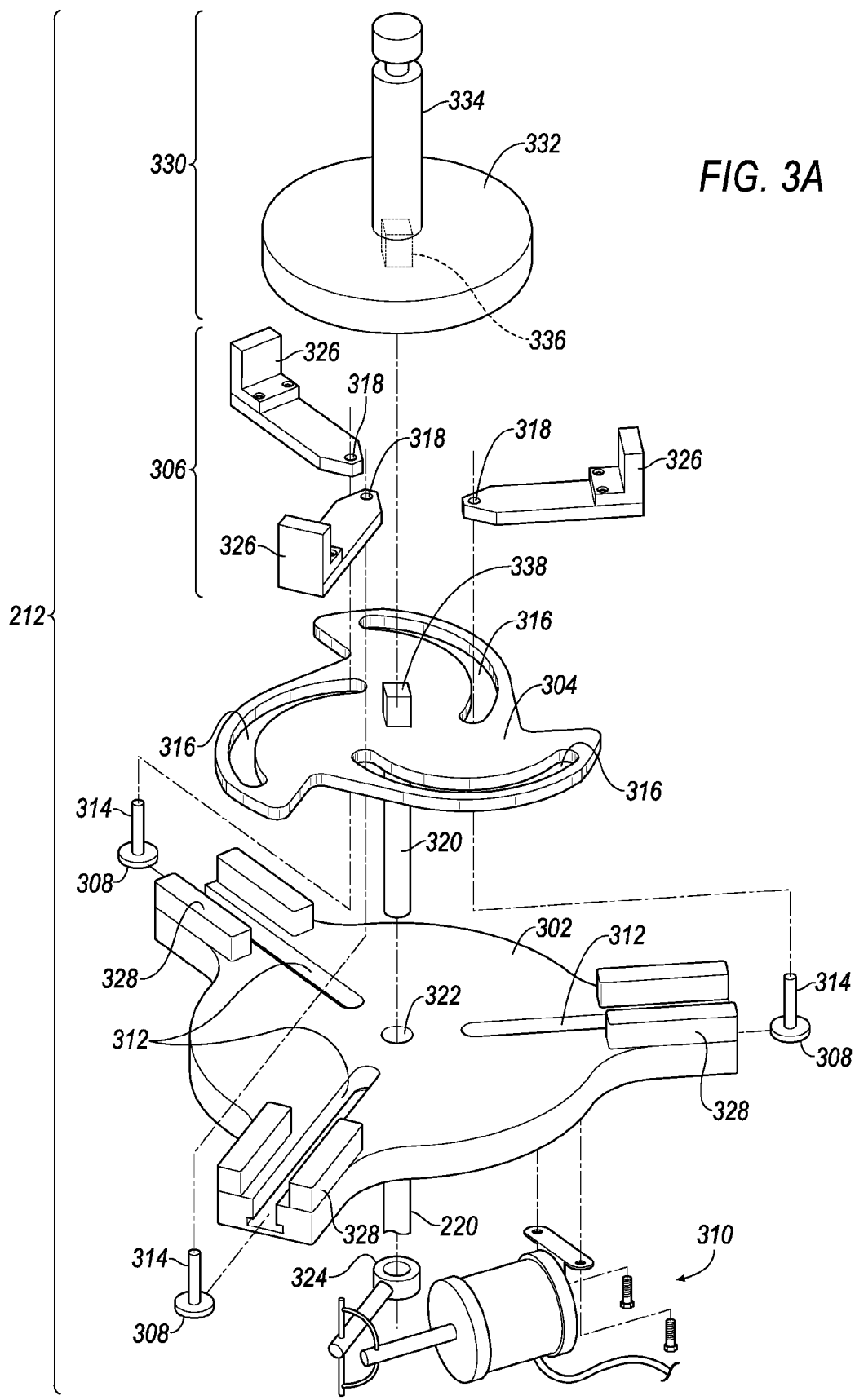
FIG. 3A illustrates an exploded perspective view of a claw portion of the single-cell workstation of FIGS. 2A-2J in accordance with an exemplary embodiment of the invention.

Referring now to FIGS. 3A-3E, the claw portion 212 is shown and described according to an embodiment. In an embodiment, as seen in FIG. 3A, the claw portion 212 includes a fixed portion 302, a rotatable portion 304, wheel engaging portions 306, sliding portions 308 and an actuator portion 310.

Figure 3B:
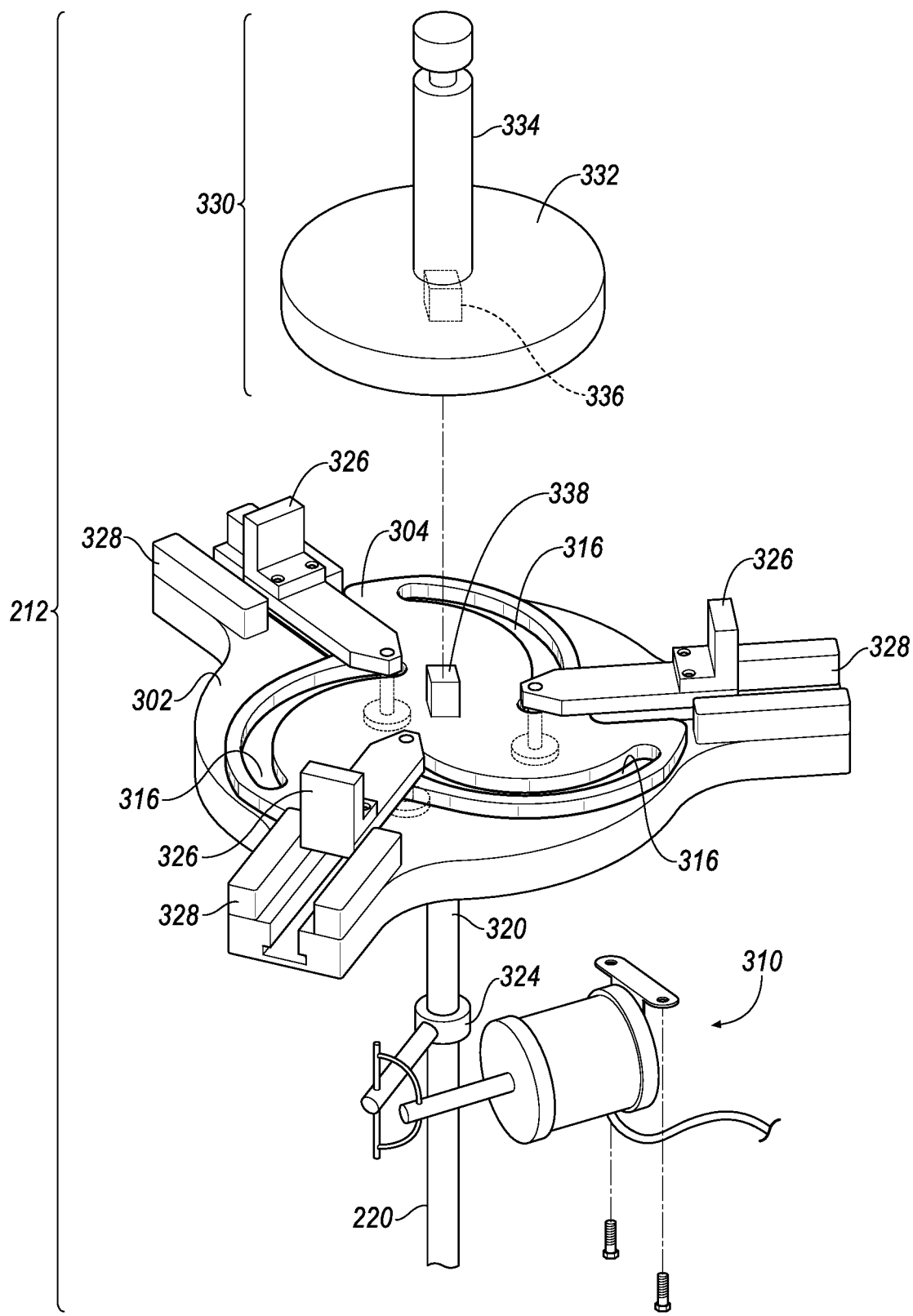
FIG. 3B illustrates an assembled perspective view of the claw portion of FIG. 3A in accordance with an exemplary embodiment of the invention.

Referring to FIGS. 3A and 3B, the slidable portions 308 are slidably-disposed in radial channels 312 formed in the fixed portion 302. An axial post 314 extending from each of the slidable portions 308 extends through the radial channels 312 and arcuate channels 316 that are formed in the rotatable portion 304. The axial posts 314 also extend through an opening 318 formed in each of the wheel engaging portions 306.

A central axial post 320 extends from the rotatable portion 304 and through a central axial opening 322 formed in the fixed portion 302. Upon passing through the central axial opening 322, the central axial post 320 is fixed to a key passage 324 formed by and extending from the actuator portion 310. Once assembled, axial portions 326 of the engaging portions 306 are slidably-disposed in radial guides 328 of the fixed portion 302 such that the engagement portions 306 are moveable in an inward/outward radial direction.

Figure 3C:
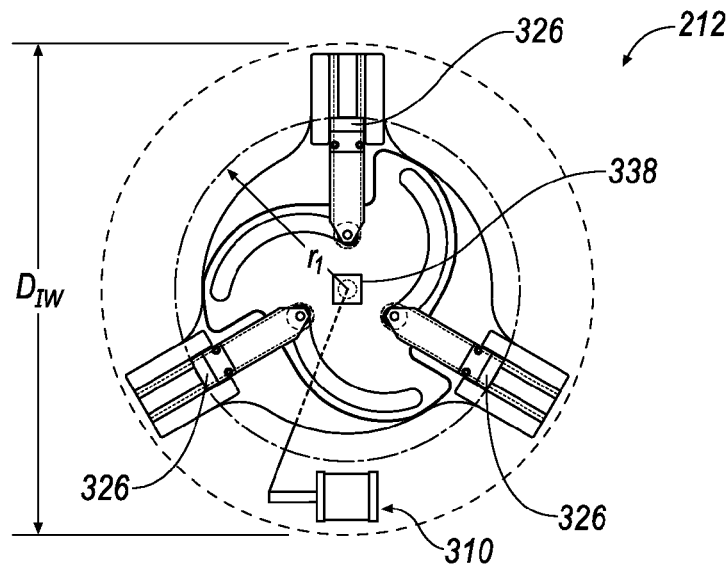
FIGS. 3C-3E illustrate top views of the claw portion of FIG. 3B in accordance with an exemplary embodiment of the invention.
Figure 3D:
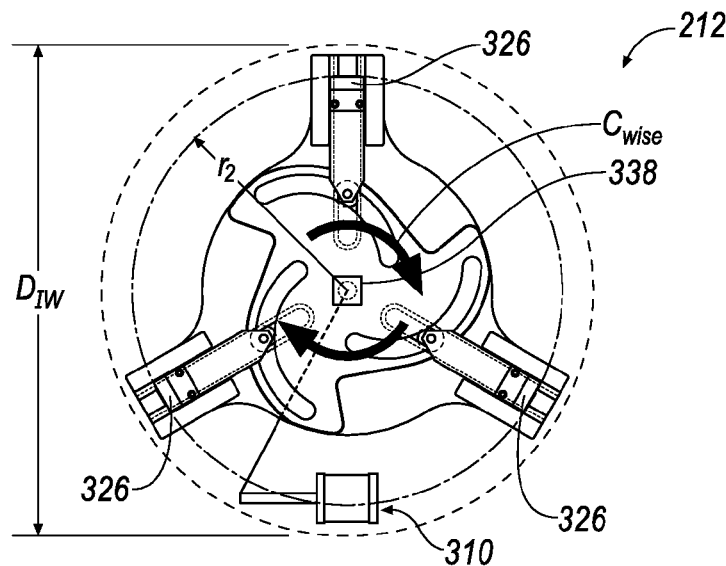
Figure 3E:
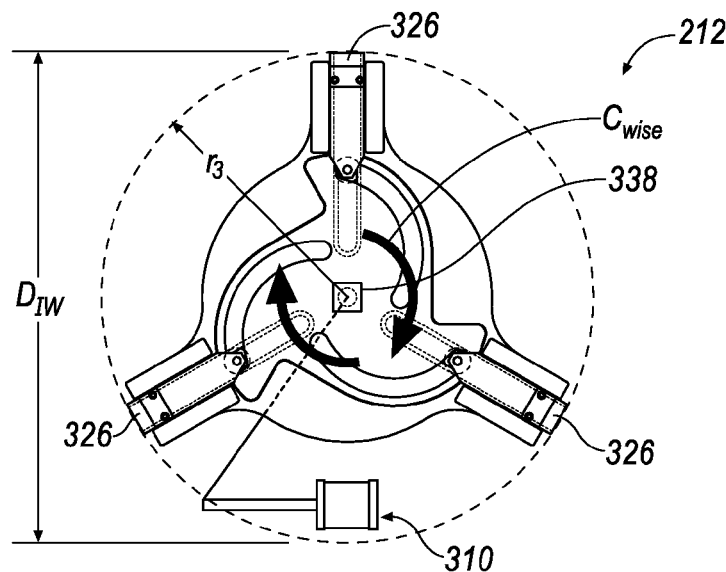

Referring to FIGS. 3C-3E, an embodiment of operating the claw portion 212 is disclosed. In general, inward and outward radial movement of the axial portions 326 is dependent upon the state of the actuator 310.

As see in FIGS. 3B and 3C, the actuator 310 is in a deactuated state such that the axial portions 326 are in a radially-retracted position. The radially-retracted position is shown to be defined by a radial distance, $r_1$, of the axial portions 326 from a central axis extending through the central axial post 320.

When the actuator 310 is actuated, as shown in FIGS. 3D and 3E, the result is rotatable, clockwise movement, $C_{WISE}$, of the central axial post 320 due to the fact that the central axial post is fixed or keyed to the key passage 324. The rotatable, clockwise movement, $C_{WISE}$, of the central axial post 320 translates into clockwise movement, $C_{WISE}$, of the rotatable portion 304a, which translates into clockwise movement, $C_{WISE}$, of the axial posts 314 disposed in the arcuate channels 316, which translates into radial-outward movement of the slidable portions 308 disposed in the radial channels 312 and radial outward movement of axial portions 326 disposed in the radial guides 328.

As seen in FIGS. 3D and 3E, radially-outward positioning of the axial portions 326 is shown to be defined by progressively-increased radial distances, $r_2$, $r_3$, that are greater than the radial distance, $r_1$. When the axial portions 326 are advanced to the maximum radial distance, $r_3$, the axial portions 326 radially engage an inner diameter, $D_{IW}$, of the wheel, W, to secure the wheel, W, to the claw portion 212.

Referring back to FIGS. 3A and 3B, in an embodiment, the claw portion 212 may also include a detachable portion shown generally at 330. The detachable portion 330 generally includes a plate 332 and a center-pull arm 334 that extends substantially perpendicularly from the plate 332. The plate 332 includes a recess 336 for receiving a coupling portion 338 extending from the rotatable portion 304.

As illustrated, the coupling portion 338 is centrally located on the rotatably portion 304 such that the axis extending through the central axis post 320 also extends through the coupling portion 338. Although shown in a generic illustration, the coupling portion 338 and plate 332 may be joined mechanically, pneumatically, or the like at the recess 336. The function and purpose for detaching the detachable portion 330 from the rotatable portion 304 is explained in greater detail at FIGS. 2E and 5A-5R.

Figure 2C:
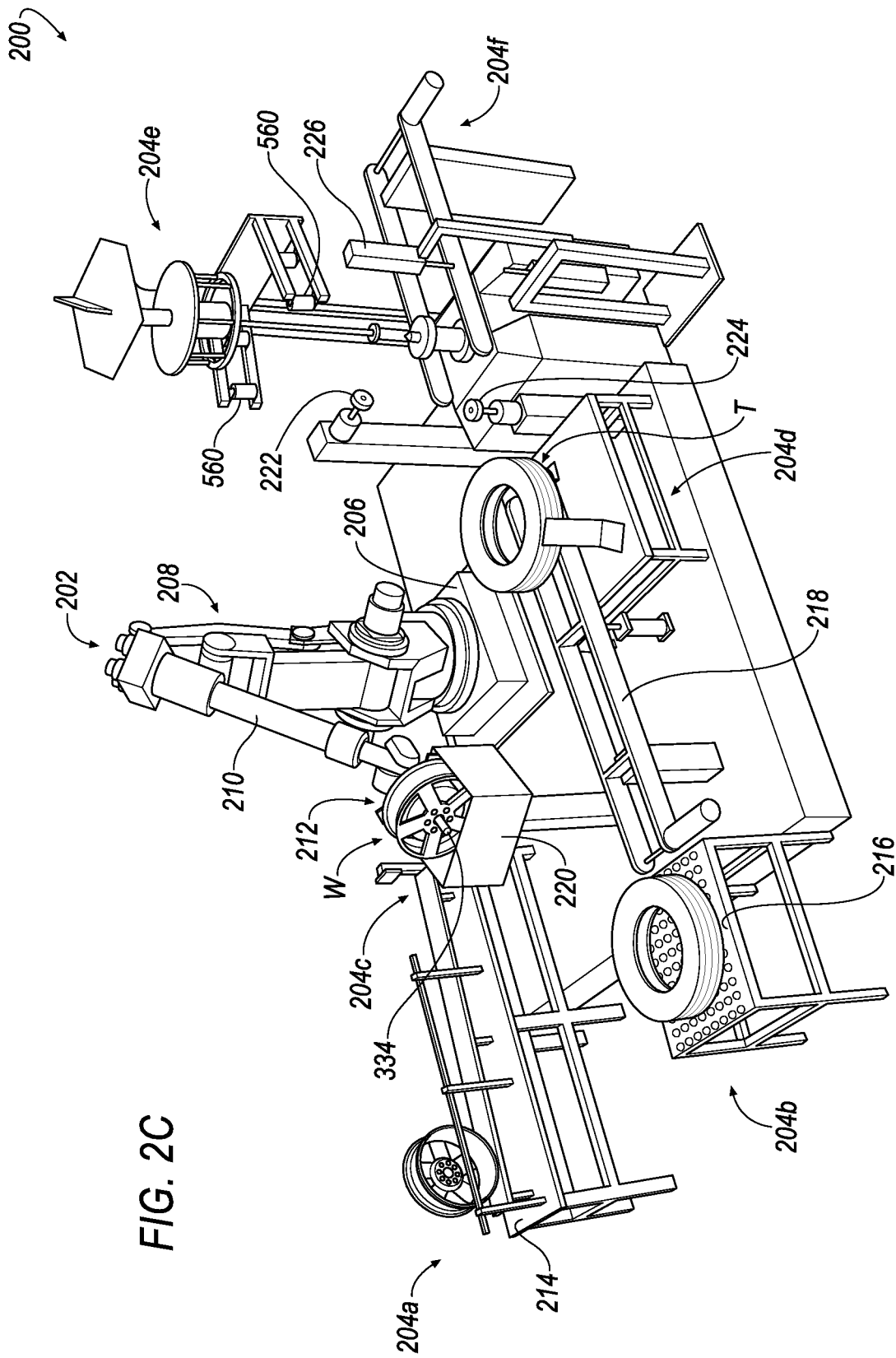

Referring now to FIG. 2C, once the wheel, W, has been secured to the claw portion 212, the body portion 208 and arm portion 210 are oriented such that the claw portion 212 locates the wheel, W, proximate a lubricating sub-station 204c. According to an embodiment, the lubricating sub-station 204c may include a tray 220 for retaining a lubricant (not shown), such as, for example, soapy-water, grease, or the like.

In an embodiment, the arm portion 210 may be orientated such that a portion of the circumference of the wheel, W, is submerged in the tray 220 containing the lubricant. Once submerged as desired, the claw portion 212 may be rotated, as desired, relative the arm portion 210 between approximately 0° and 360° such that at least a substantial portion of the circumference of the wheel, W, has been lubricated. In an embodiment, approximately half of the wheel, W, is submerged in the lubricant and the wheel, W, is rotated 180° to lubricate the non-submerged portion of the wheel, W.

In another embodiment, the tray 220 may include lubricating rollers (not shown) having a lubricant disposed thereon that are moved 360° about the circumference of the wheel, W, such that the claw portion 212 remains in a fixed position and does not rotate relative the arm portion 210 during a lubricating operation. Alternatively, in another embodiment, the arm portion 210 may be oriented such that the entire wheel, W, is submerged in the lubricant.

Figure 2D:
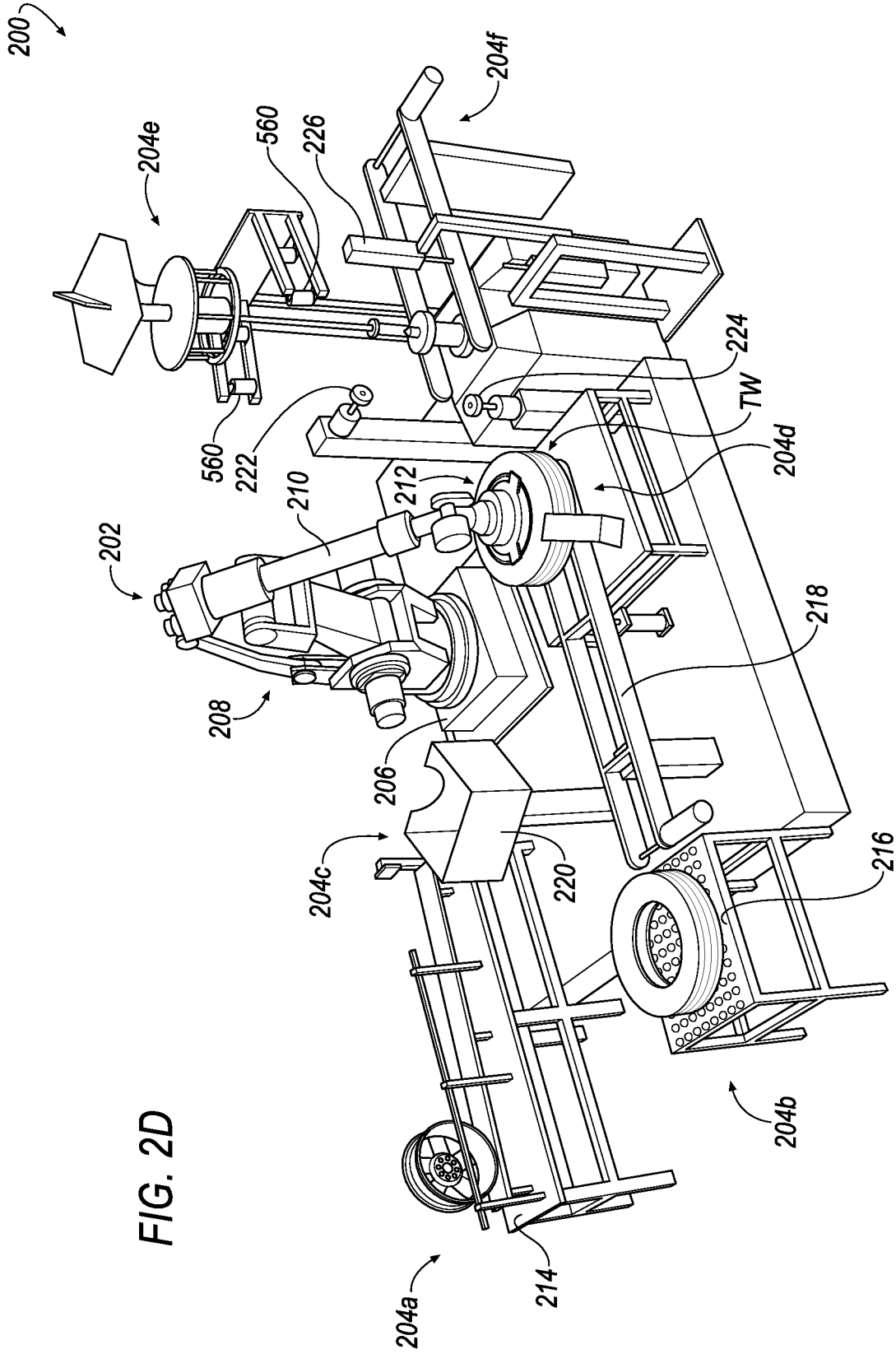

Referring now to FIG. 2D, the body portion 208 and arm portion 210 are orientated such that the claw portion 212 locates the lubricated wheel, W, proximate a tire mounting sub-station 204d. As illustrated, the conveyor device 218 advances a tire, T, to the tire mounting sub-station 204d such that the tire, T, may be mounted to the wheel, W, to form a non-inflated tire-wheel assembly, TW. It will be appreciated that before, during and after the tire, T, is mounted to the wheel, W, to form the non-inflated tire-wheel assembly, TW, the claw portion 212 remains engaged with the wheel, W.

Figure 4A:
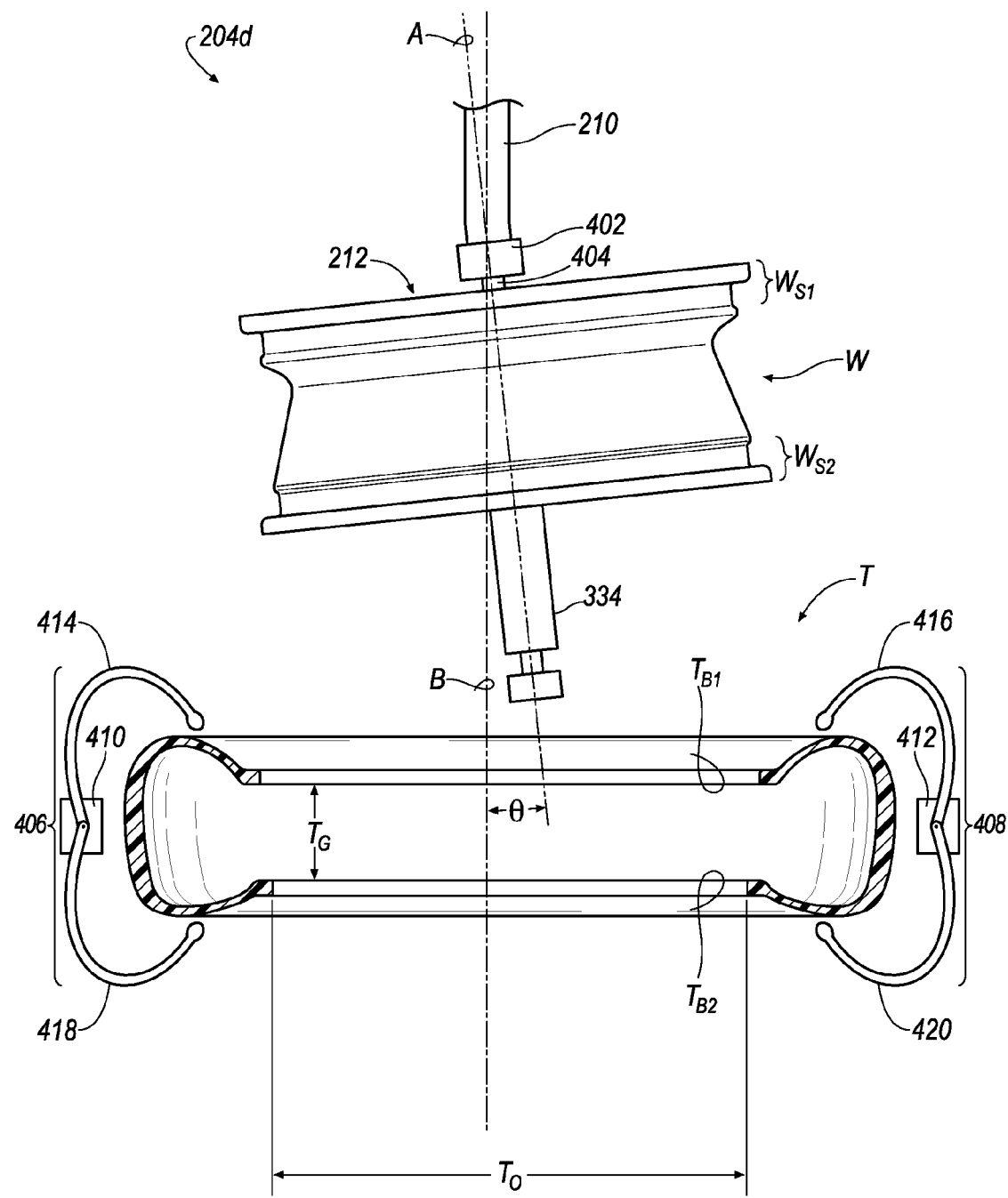
FIGS. 4A-4D illustrate side views of a tire mounting sub-station in accordance with an exemplary embodiment of the invention.

In an embodiment, the tire mounting sub-station 204d may be referred to as either a helical mounting sub-station or a precessional mounting sub-station for reasons set forth in the foregoing disclosure. Referring to FIG. 4A, the wheel, W, is shown fixed to the claw portion 212 and the arm portion is shown generally at 210. Shown between the claw portion 212 and arm portion 210 is a rotating actuator 402 and spindle 404. The spindle 404 permits rotational movement of the claw portion 212 relative the arm portion 210.

The arm portion 210 may be coupled to a linear actuator (not shown) such that linear actuator is capable of moving the claw portion 212 and wheel, W, along a first plunging axis, B. The rotating actuator 402 is oriented with respect to arm portion 210 such that the axis of rotation of rotating actuator 402 is represented by axis, A. Rotation of the actuator 402 translates into a similar rotational movement of the wheel, W, and claw portion 212 about the axis, A. The rotating actuator 402 can also be an electric, pneumatic, hydraulic, or other type of rotating actuator and is adapted to rotate wheel, W, about axis, A.

The tire, T, is shown to include a first tire bead, $T_{B1}$, and a second tire bead, $T_{B2}$. Beads $T_{B1}$, $T_{B2}$ are typically separated by a gap, $T_G$. At least one bead compression mechanism 406 is located proximate a sidewall portion of tire, T. In the embodiment, two bead compression mechanisms 406, 408 are included; however, it is contemplated within the scope of this invention that one or more bead compression mechanisms may be used.

Bead compression mechanism 406, 408 includes a respectively associated compression actuator 410, 412 which is, in turn, is coupled to its respectively-associated top pinching fingers 414, 416 and bottom pinching fingers 418, 420.

Figure 4B:
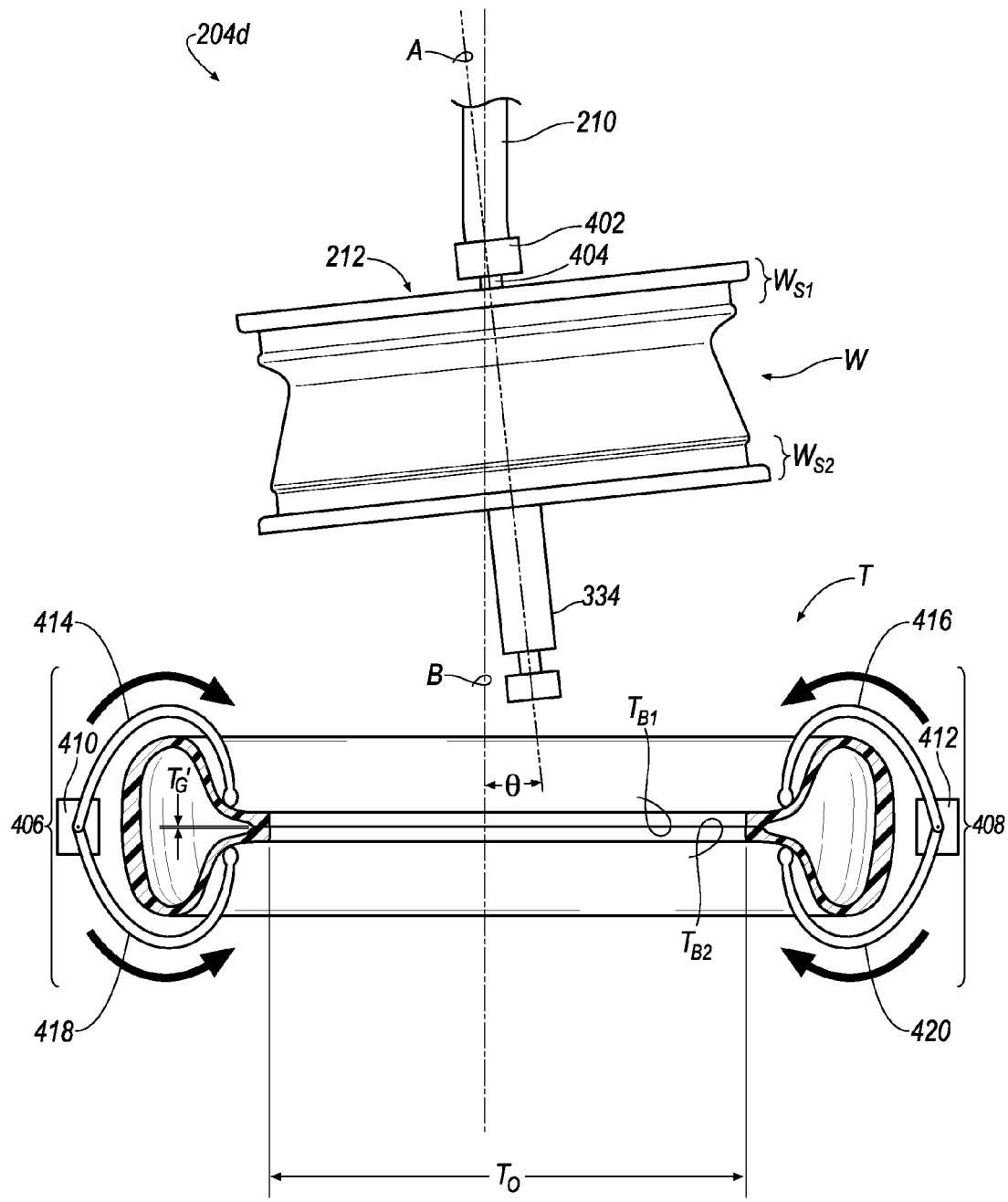

Now referring to FIGS. 4A and 4B, in order to mount wheel, W, to tire, T, the wheel, W, is rotated about axis, A. Also, at least one bead compression mechanism 406, 408 is activated, thereby pressing together at least a portion of the bead $T_{B1}$, $T_{B2}$ of wheel, W, such that at least a portion of gap, $T_G$, is diminished (see, e.g., $T_G'$, in FIG. 4B), over that of its relaxed state (the relaxed state of which is shown at, $T_G$, in FIG. 4A).

Figure 4C:
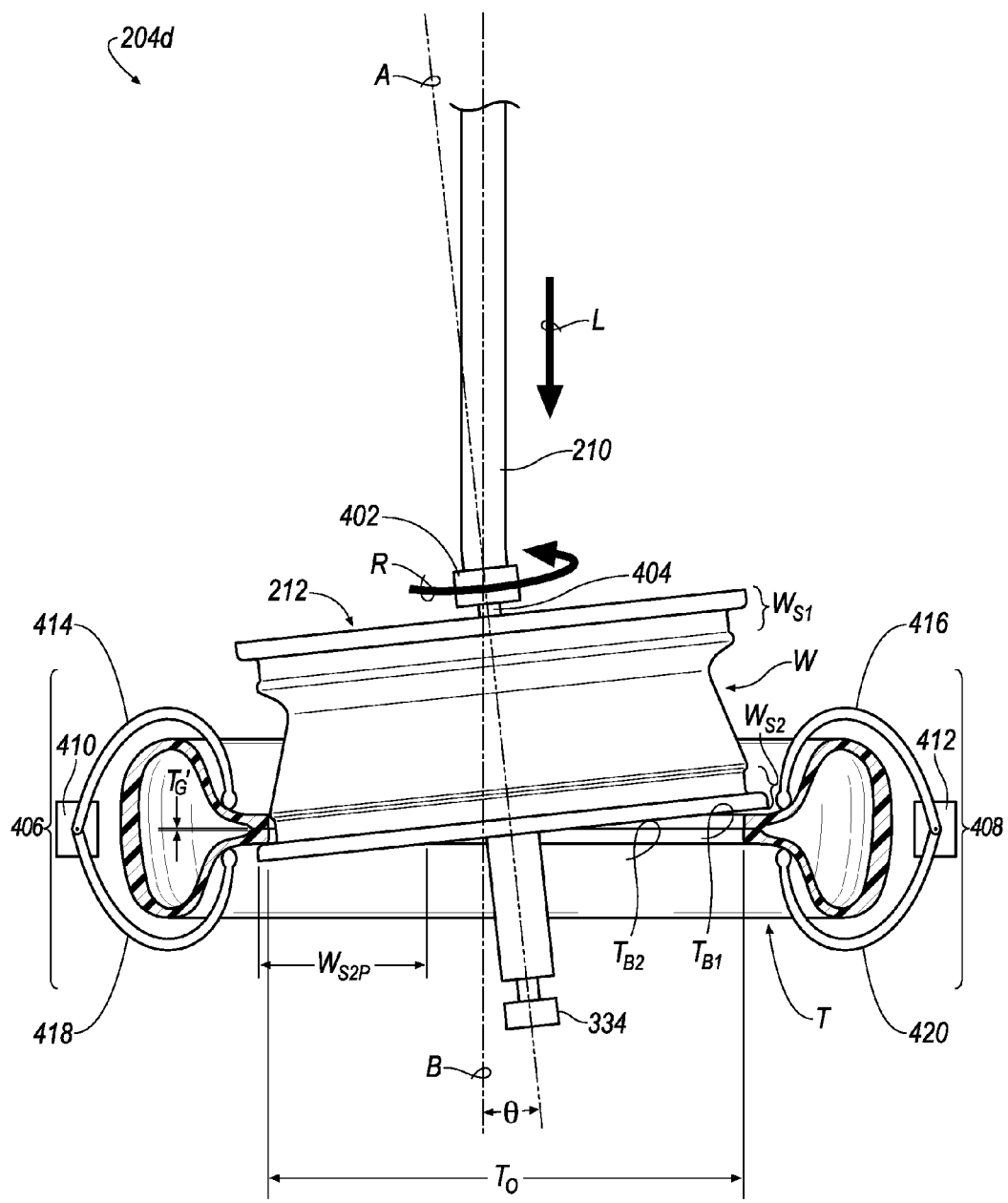

Now referring to FIG. 4A-4C, the arm portion 210 is moved/plunged linearly, L (see, e.g., FIG. 4C), along axis, B, thereby causing at least a portion, $W_{S2P}$ (see, e.g., FIG. 4C), of a second bead seat, $W_{S2}$, of the wheel, W, to pass through an opening, $T_O$, formed by first and second bead $T_{B1}$, $T_{B2}$ of the tire, T.

Figure 4D:
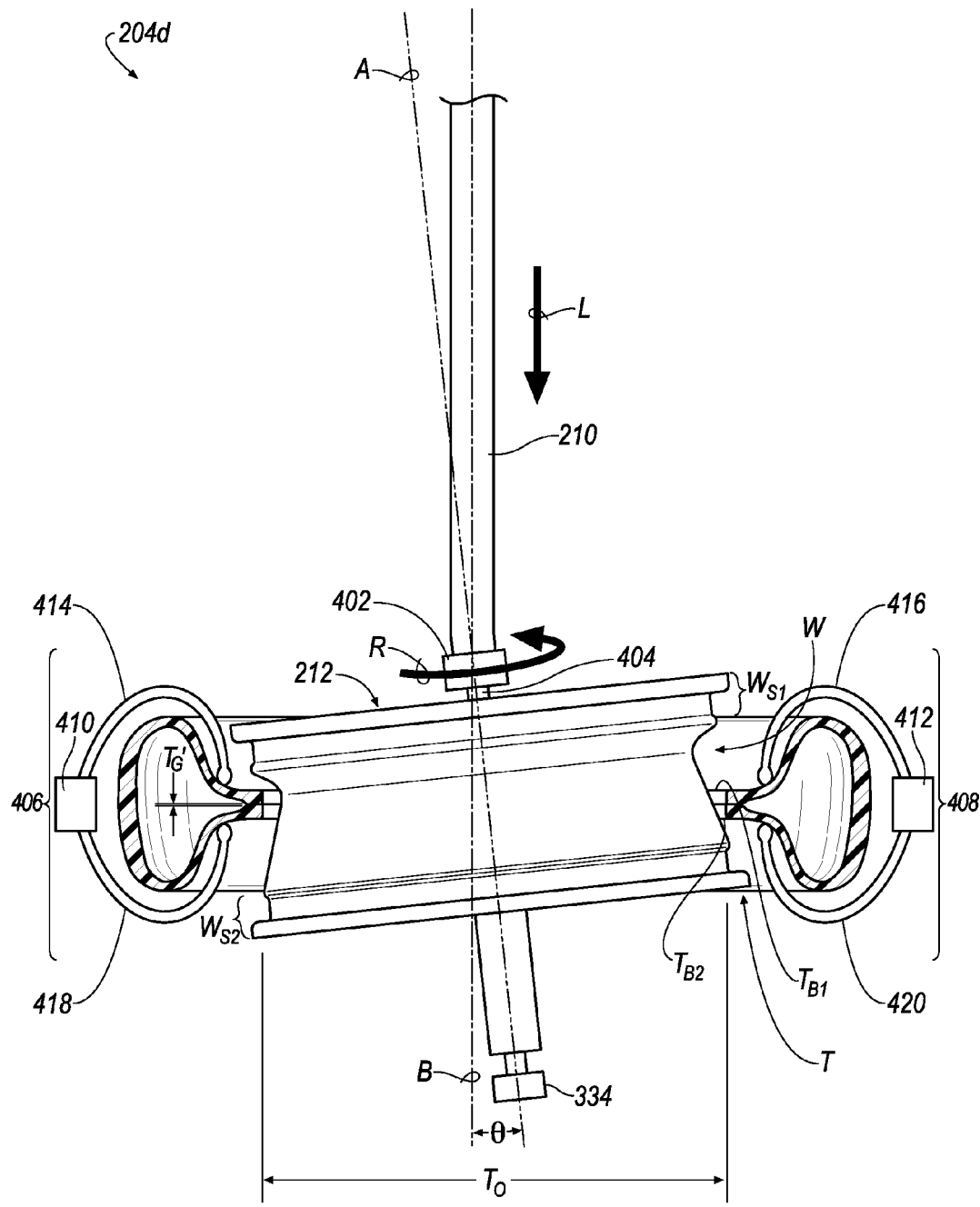

Next, as seen in FIG. 4D, linear movement, L, continues along axis, B, such that the entire second bead seat, $W_{S2}$, of wheel, W, passes through the opening, $T_O$. Once the wheel, W, has assumed the position shown in FIG. 4D, actuators 410, 412 are released such that an non-inflated tire-wheel assembly, TW, is formed and retained to the claw portion 212 for transport to the next stage of operation, being tire inflation.

Figure 4E:
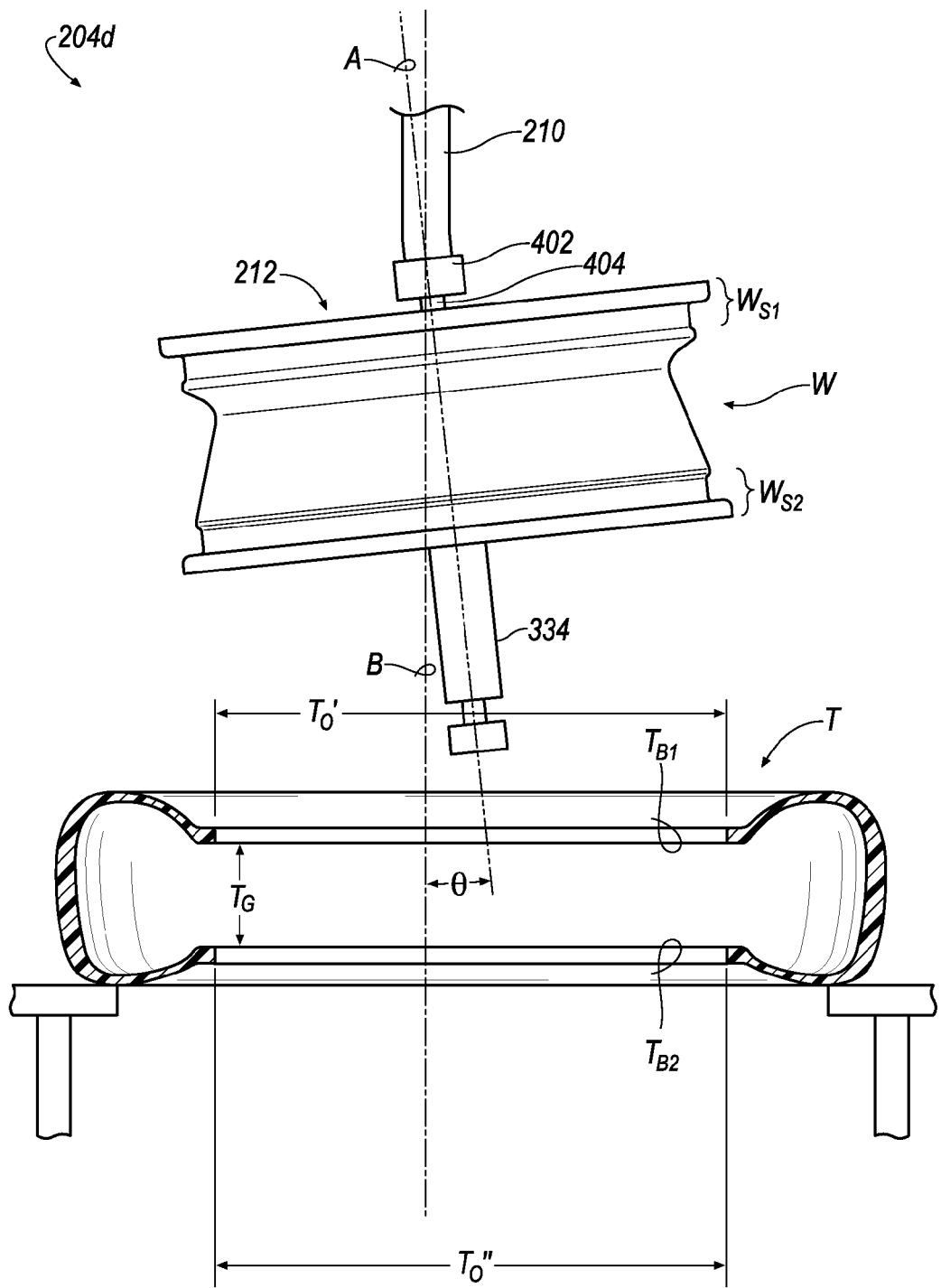
FIGS. 4E-4H illustrate side views of a tire mounting sub-station in accordance with an exemplary embodiment of the invention.

Now referring to FIG. 4E, in a second embodiment, the tire beads $T_{B1}$, $T_{B2}$ are not pinched together by a bead compression mechanism. Rather, the beads $T_{B1}$, $T_{B2}$ of tire, T, are left in their relaxed, residual state.

Figure 4F:
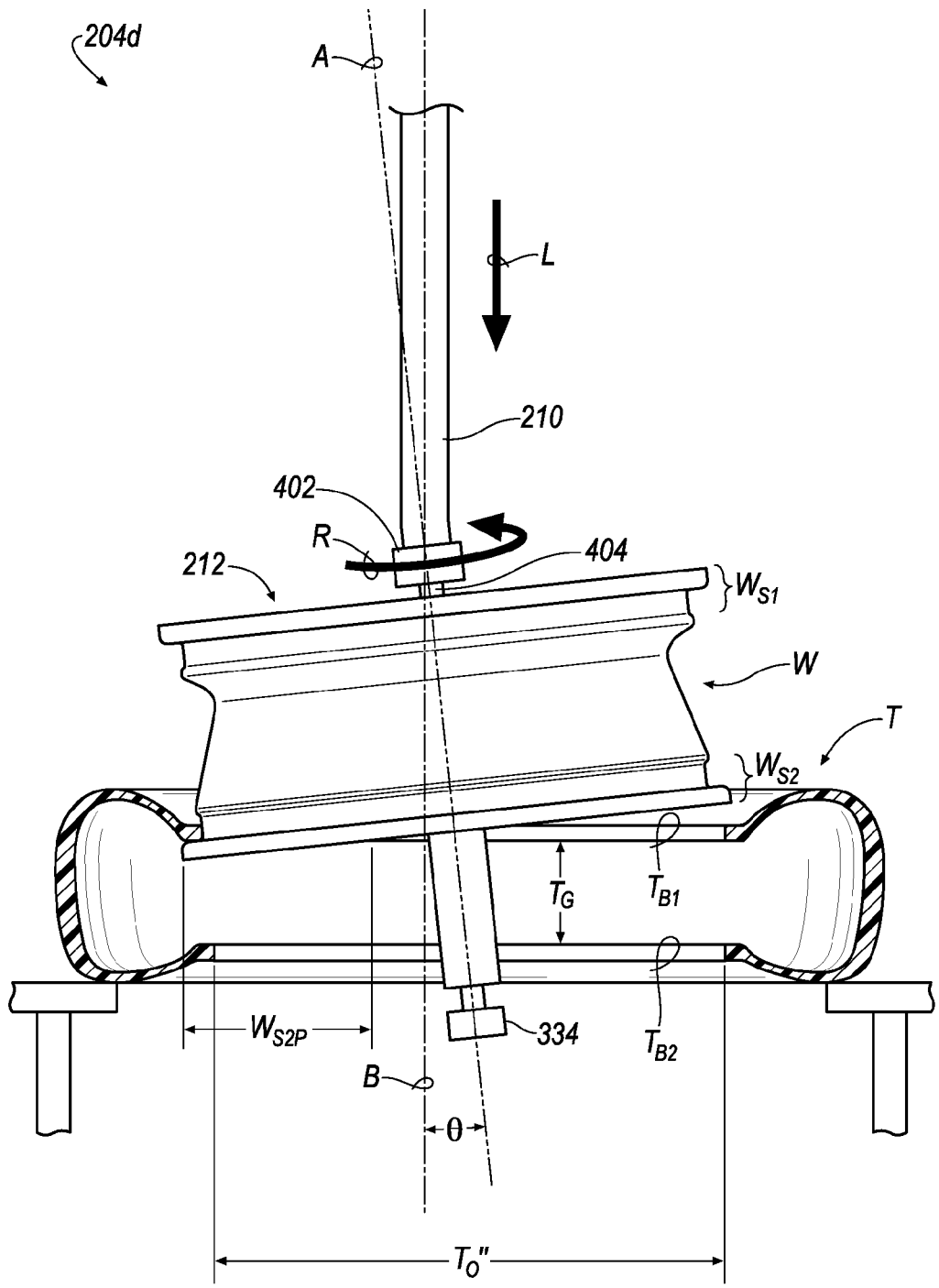
Figure 4G:
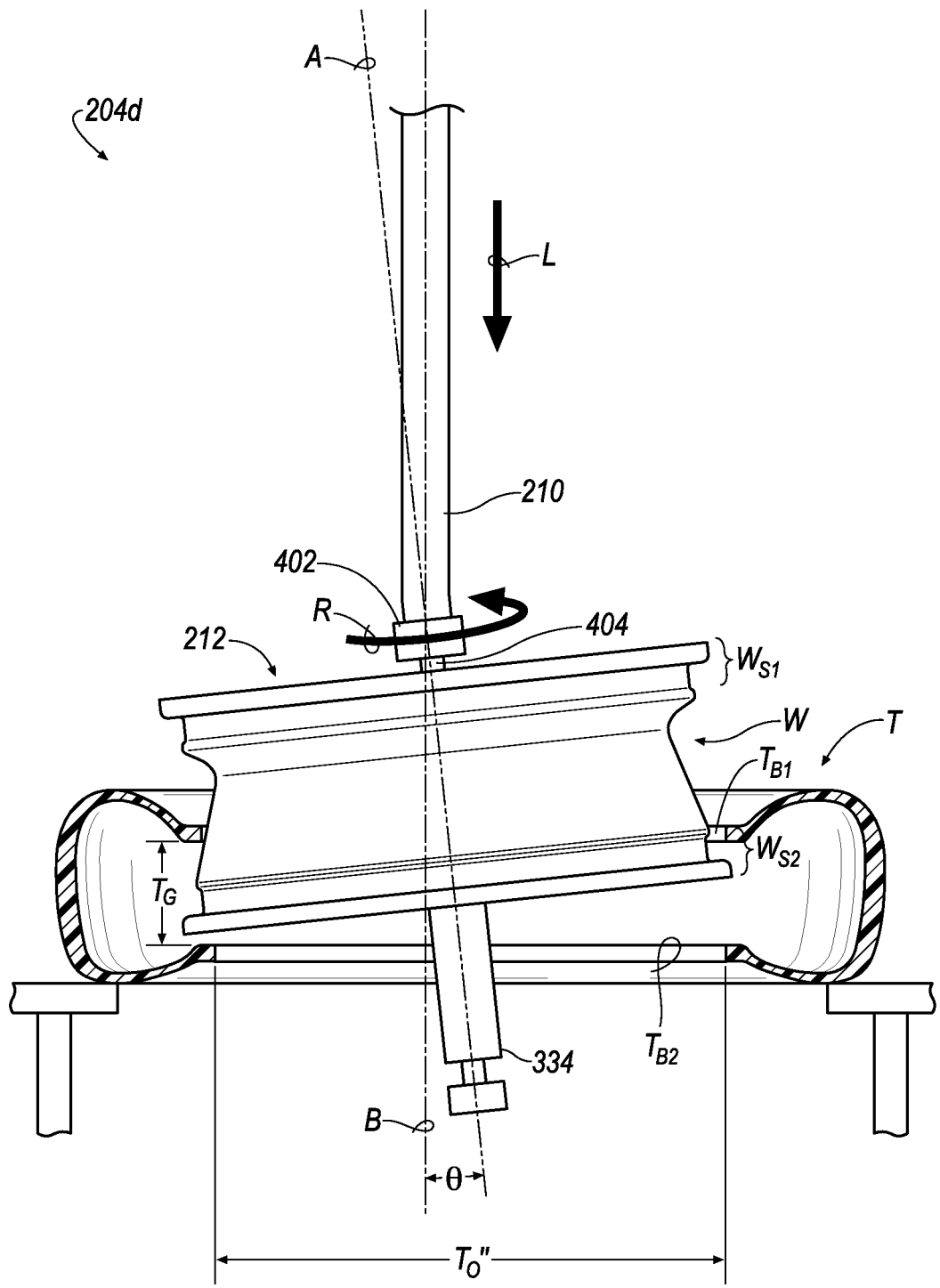

As seen in FIG. 4F, the arm portion 210 is moved linearly, L, along axis, B, while, simultaneously, the claw portion 212 precessionally rotates, R, the wheel, W, about axis, B, while the wheel, W, is being rotated about the axis, A. As the second bead seat, $W_{S2}$, of the wheel, W, is brought into contact with the first tire bead, $T_{B1}$, of the tire, T, a portion, $W_{S2P}$, of second bead seat, $W_{S2}$, will pass through the upper opening, $T_O'$, formed by the first bead, $T_{B1}$, of the tire, T. Next, as shown in FIG. 4G, as the arm portion 210 continues its linear motion, L, the second bead seat, $W_{B2}$, of the wheel, W, will completely pass through the upper opening, $T_O'$ (see, e.g., FIG. 4E), formed by first bead, $T_{B1}$.

Figure 4H:
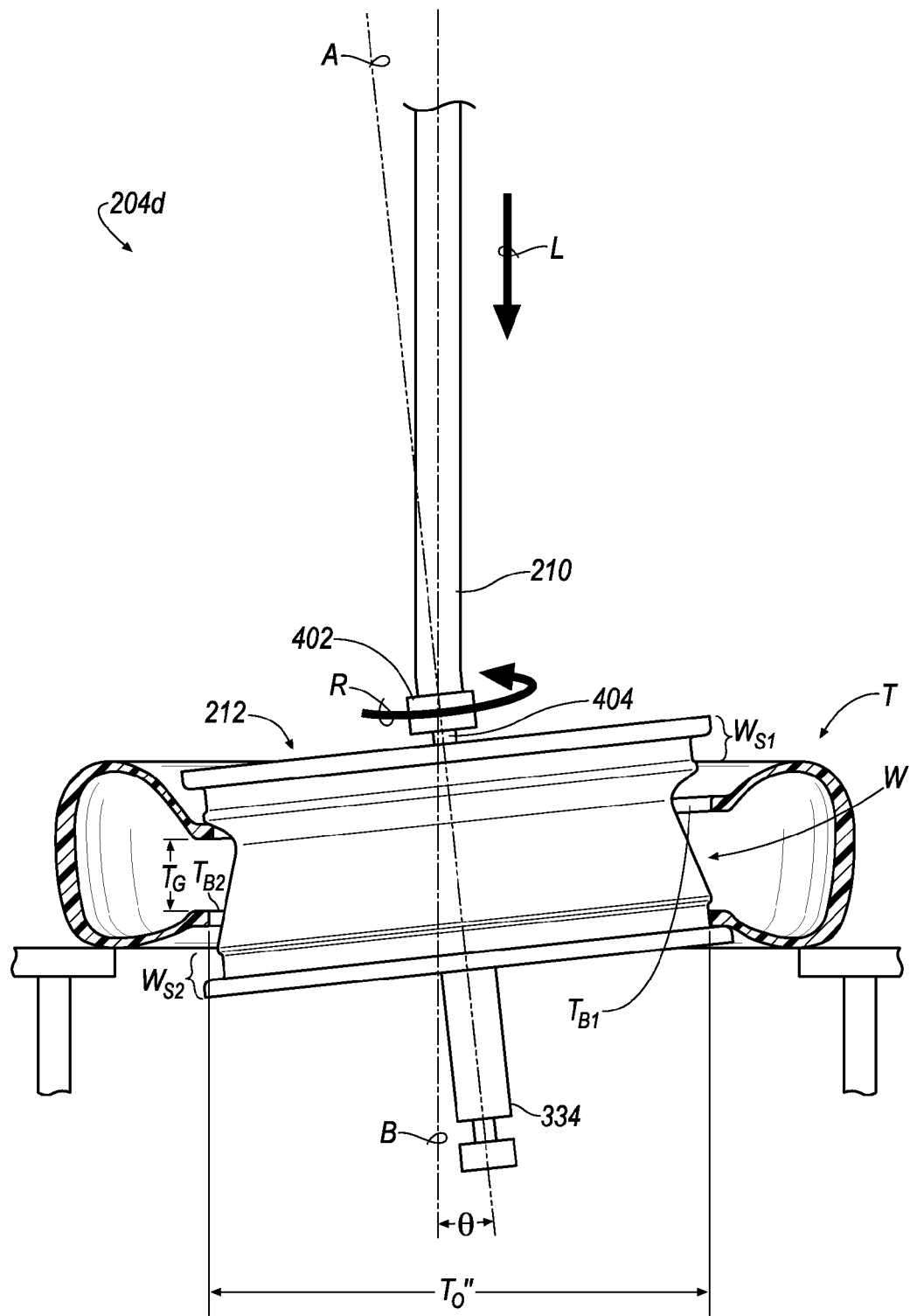

Next, as seen in FIG. 4H, as the arm portion 210 is still further urged along axis, B, the second bead seat, $W_{S2}$, of the wheel, W, will pass through the lower opening, $T_O''$, formed by the second bead, $T_{B2}$, of the tire, T. Once the wheel, W, has assumed the position shown in FIG. 4H, a non-inflated tire-wheel assembly, TW, is formed and retained to the claw portion 212 for transport to the next stage of operation, being tire inflation.

Although FIGS. 4A-4H generally shows that tire, T, is concentric with axis, B, nothing herein shall limit the orientation of tire, T, relative to axis, B, in this way. It is contemplated that other orientations between axis, B, and the center of tire, T, will work equally well. Further, the rotational axis, A, may, in an embodiment, be co-axial with plunger axis, B. However, in the illustrated embodiment, the rotational axis, A, is angularly oriented with respect to axis, B, as depicted by angle, θ.

Yet even further, if the rotational axis, A, is fixed about the plunging axis, B, the mounting sub-station 204d is referred to as a helical mounting sub-station; as such, the angle, θ, is referred to as a helical angle of approach. Alternatively, if the arm portion 210 rotates about the axis, B, the rotational axis, A, would pivot about the plunging axis, B, at the point of intersection of the axes A and B; as such the mounting sub-station 204d would be referred to as a precessional mounting sub-station 204d. Thus, the angle, θ, would be referred to as a precessional angle of approach.

It will be appreciated that in the helical mounting sub-station embodiment, the rotational movement of the wheel, W, about the rotational axis, A, may be compounded with a plunging movement about the plunging axis, B. Alternatively, it will be appreciated that in the precessional mounting sub-station 204e embodiment, the plunging movement about the axis, B, may or may not be compounded with the rotational movement about the axis, A. For example, if the plunging movement about the axis, B, is not included, the precessional movement of the wheel, W, about the tire, T, will result in the tire, T, being self-threaded onto the wheel, W, upon the wheel, W, contacting the tire, T. If, however, the precessional movement of the wheel, W, is also compounded with plunging movement about the axis, B, the wheel, W, is plunged onto the tire, T, while the tire, T, also self-threads onto the wheel, W.

Figure 2E:
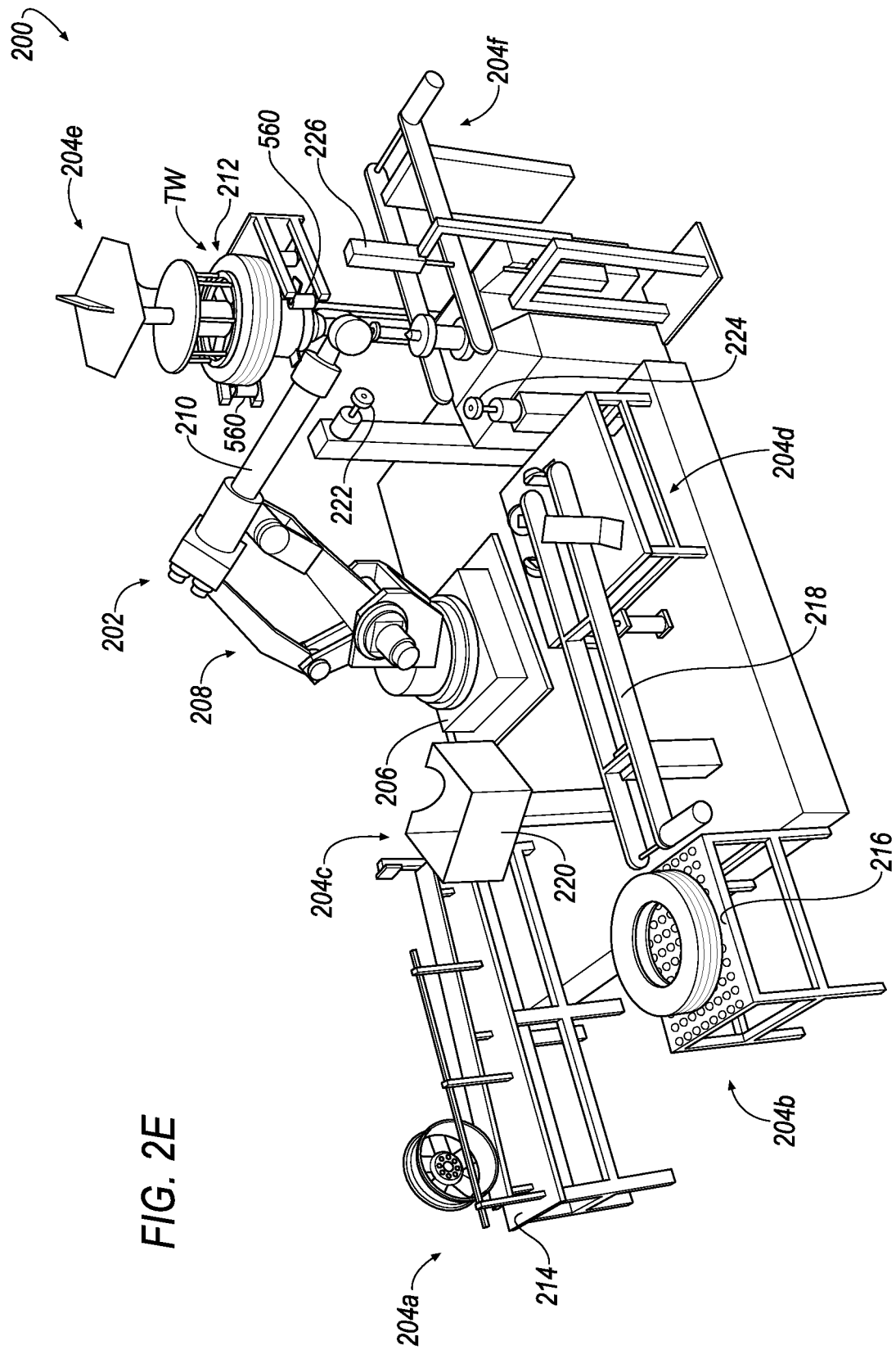
Figure 5A:
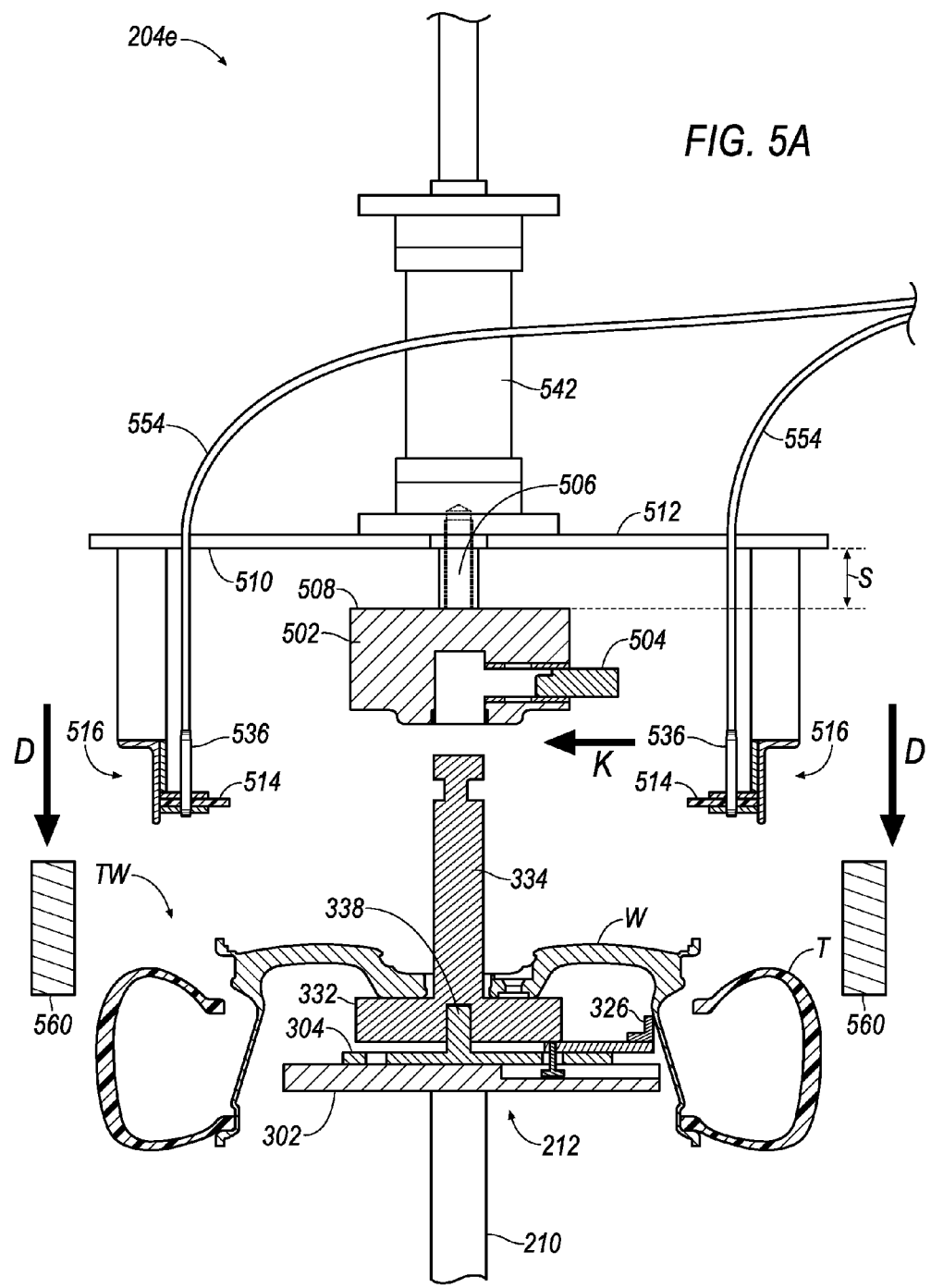
FIGS. 5A-5R illustrate side views of an inflating sub-station in accordance with an exemplary embodiment of the invention.

Referring now to FIG. 2E, the body portion 208 and arm portion 210 are orientated such that the claw portion 212 locates the non-inflated tire-wheel assembly, TW, proximate an inflating sub-station 204e. As seen in FIG. 5A, once the arm portion 210 has located the non-inflated tire-wheel assembly, TW, proximate the inflating sub-station 204e, the inflating sub-station 204e moves toward the tire-wheel assembly, TW, generally in the direction of the arrow, D.

Figure 5B:
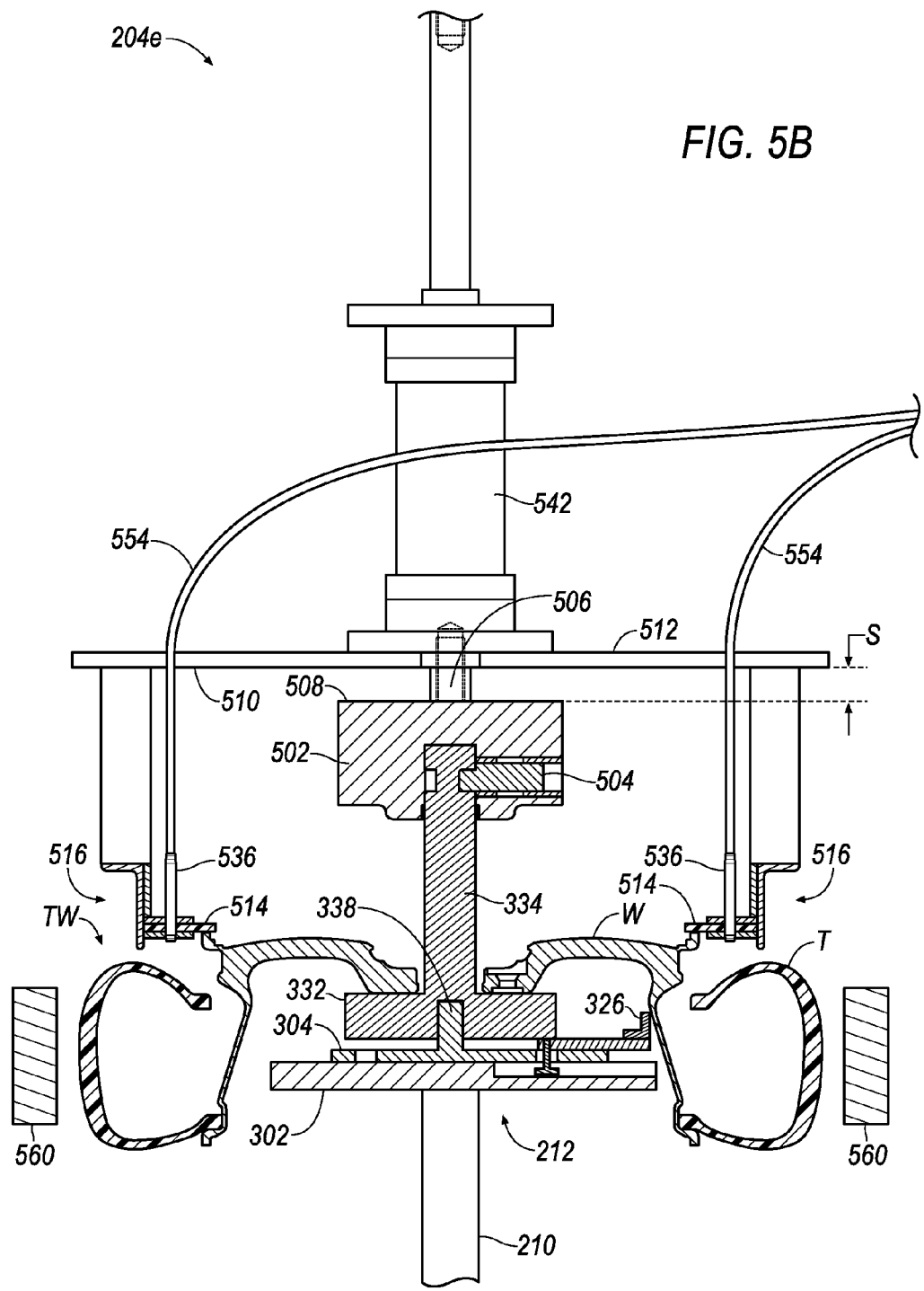

Referring to FIGS. 5A and 5B, movement of the inflating sub-station 204e in the direction of the arrow, D, eventually results in the center-pull arm 334 of the detachable portion 330 being axially inserted into a locking device 502 of the inflating sub-station 204e. Subsequently, one or more keys 504 of the locking device 502 is/are moved radially inwardly according to the direction of arrow, K, for radial engagement with the center-pull arm 334.

Figure 5C:
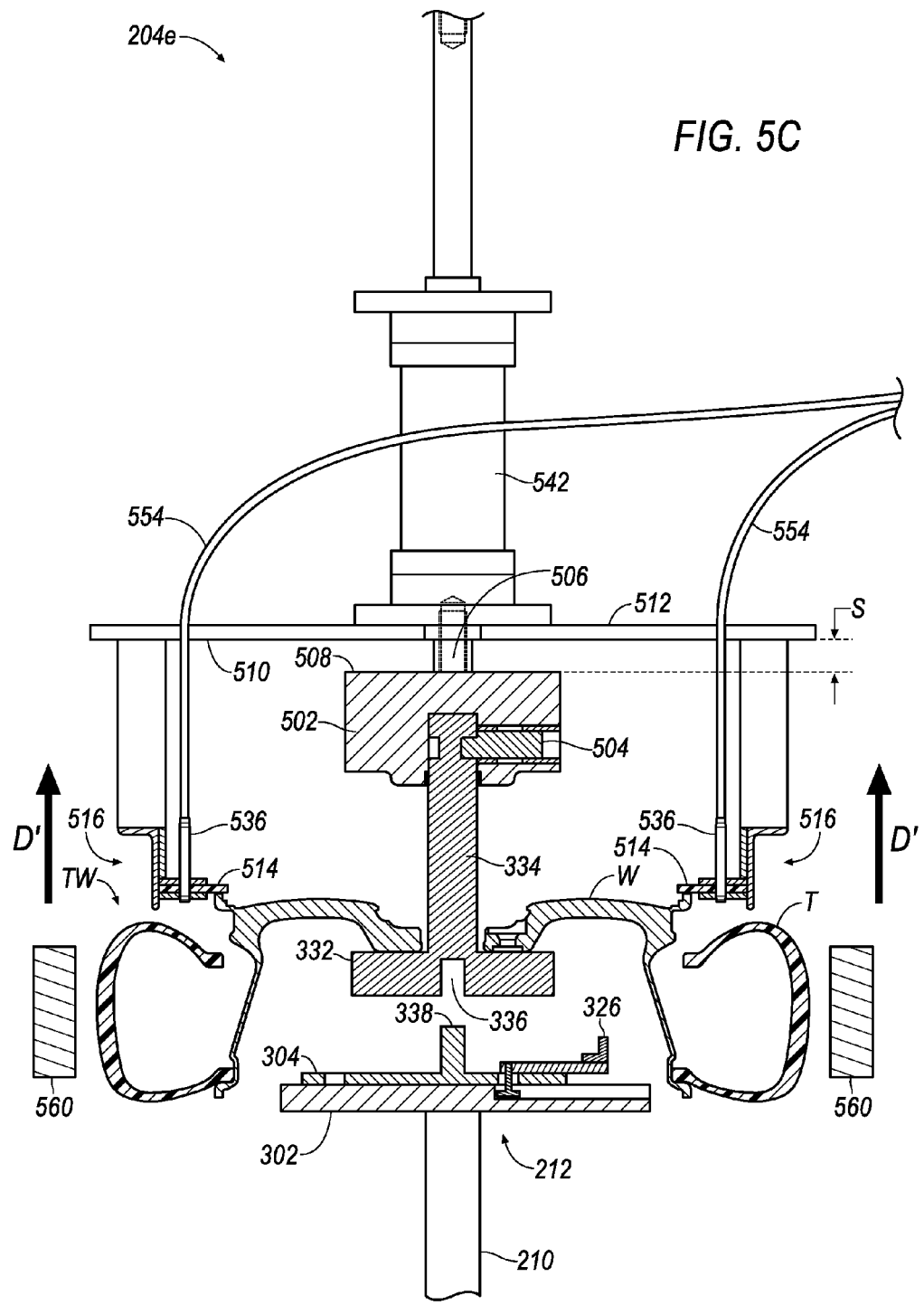
Figure 5D:
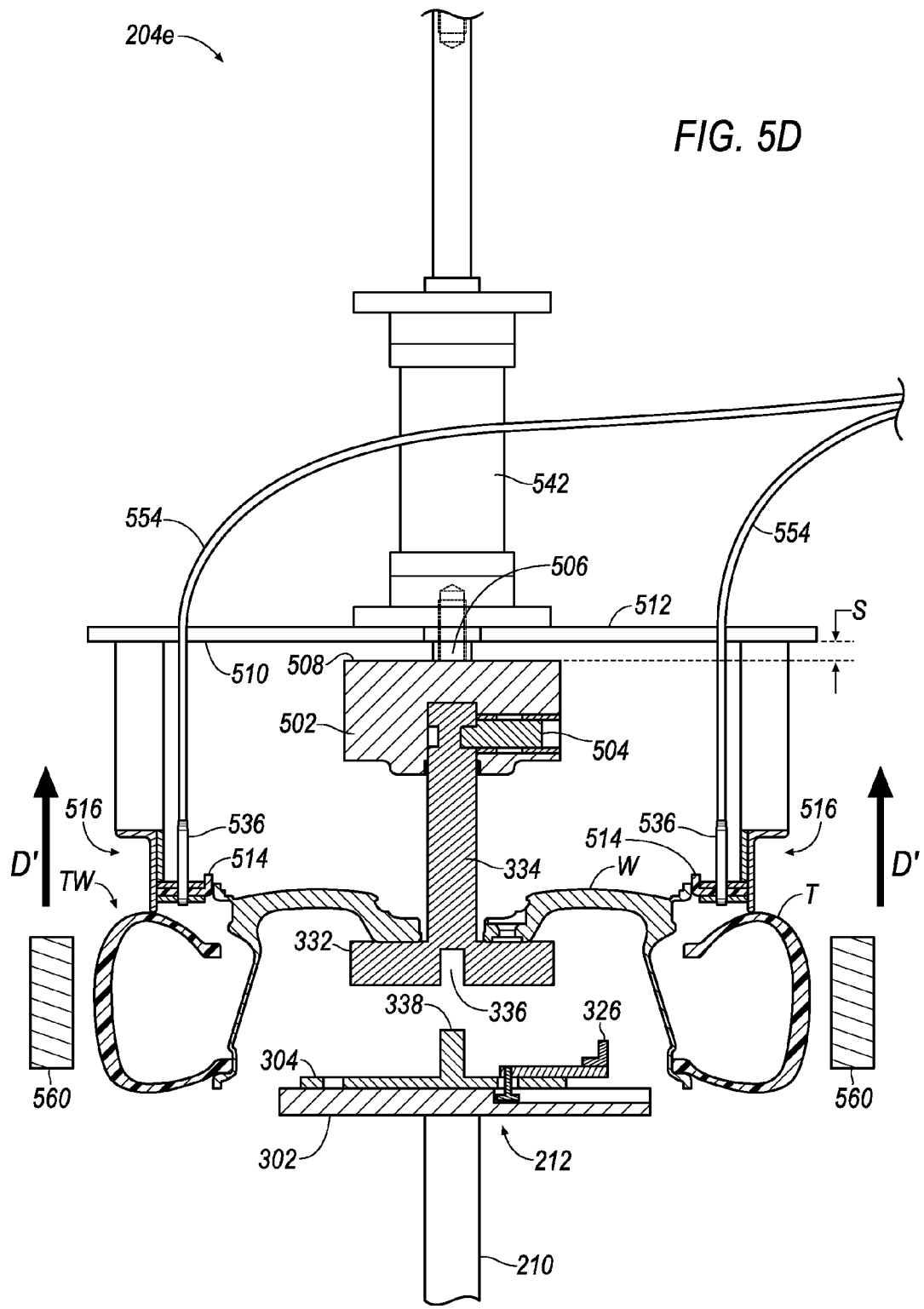

Referring to FIG. 5C, once the one or more keys 504 has radially engaged the center-pull arm 334, the axial portions 326 of the claw portion 212 radially disengage the inner diameter, $D_{IW}$, of the wheel, W, to release the wheel, W, from the arm portion 210 and claw portion 212. Then, subsequent to or coincident with the release of the wheel, W, from the claw portion 212, the coupling portion 338 and plate 332 are separated to thereby cause the detachable portion 330 to retain the non-inflated tire-wheel assembly, TW, to the inflating sub-station 204e.

Still referring to FIG. 5C, with the center pull arm 334 secured to the locking device 502, an adjustment pin 506 draws (according to the direction according to the arrow, D') an upper surface 508 of the locking device 502 toward an inboard surface 510 of a carrier plate 512 to thereby reduce a spacing, S, between the upper surface 508 and the inboard surface 510. By reducing the spacing, S, a flip seal 514 of the inflating sub-station 204e is moved as follows.

As shown in FIGS. 5I-5N, the reduced and subsequent increase of the spacing, S, results in a change of orientation of the flip seal 514 relative the wheel, W. In general, the flip seal 514 is retained by a carrier 516.

The carrier 516 generally includes a shroud portion 518 that defines an outer periphery 520 of the carrier 516 and an inner periphery 522 of the carrier 516. According to an embodiment, the flip seal 514 is positioned about the inner periphery 522 of the carrier 516 and abuts an inner periphery surface 524 of a radial portion 526 and an inner periphery surface 528 of a rim portion 530. Once the flip seal 514 is located against the carrier 516 as described above, a retainer 532 abuts and sandwiches the flip seal 514 with the radial portion 526 of the carrier 516 with an end portion 534 of the retainer 532 abutting the inner periphery surface 528 of the rim portion 530.

One or more inflators 536 may be inserted through one or more respective passages 538 formed in the carrier plate 512 and one or more passages, which are shown generally at 540. As illustrated, passages are formed, respectively, in axial alignment, in each of the flip seal 514, carrier 516, and retainer 532 to define the one or more passages 540.

Figure 5E:
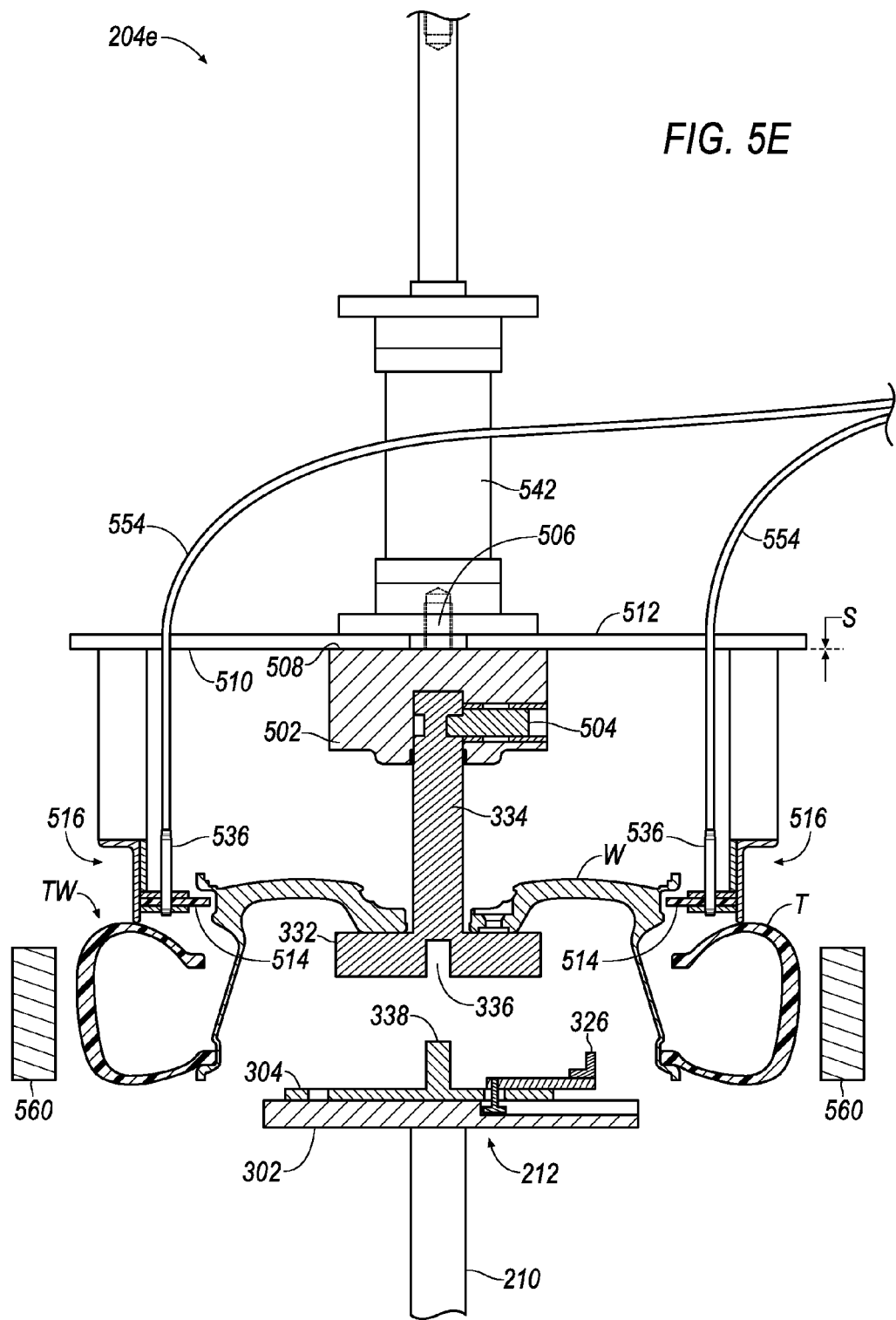
Figure 5F:
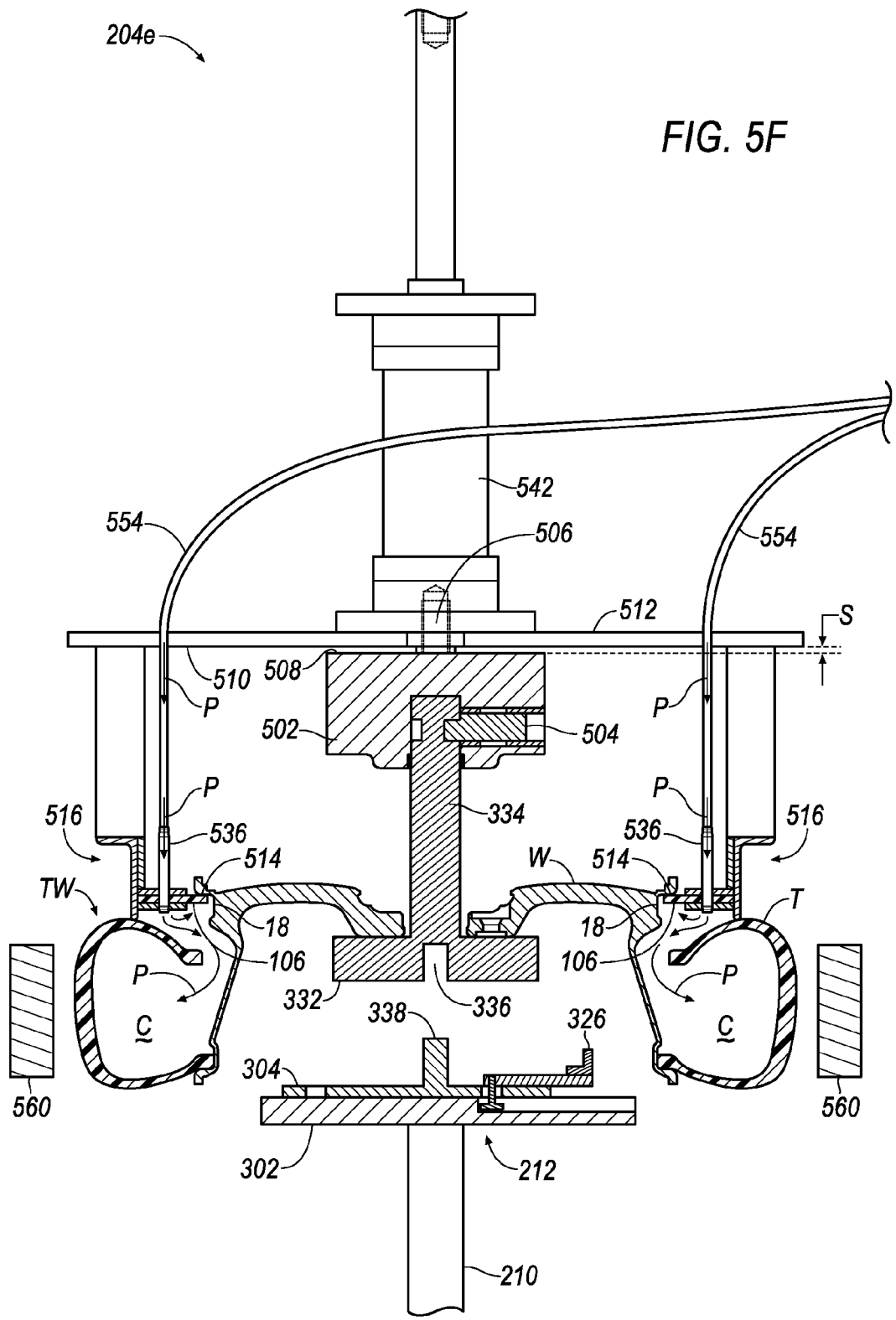
Figure 5G:
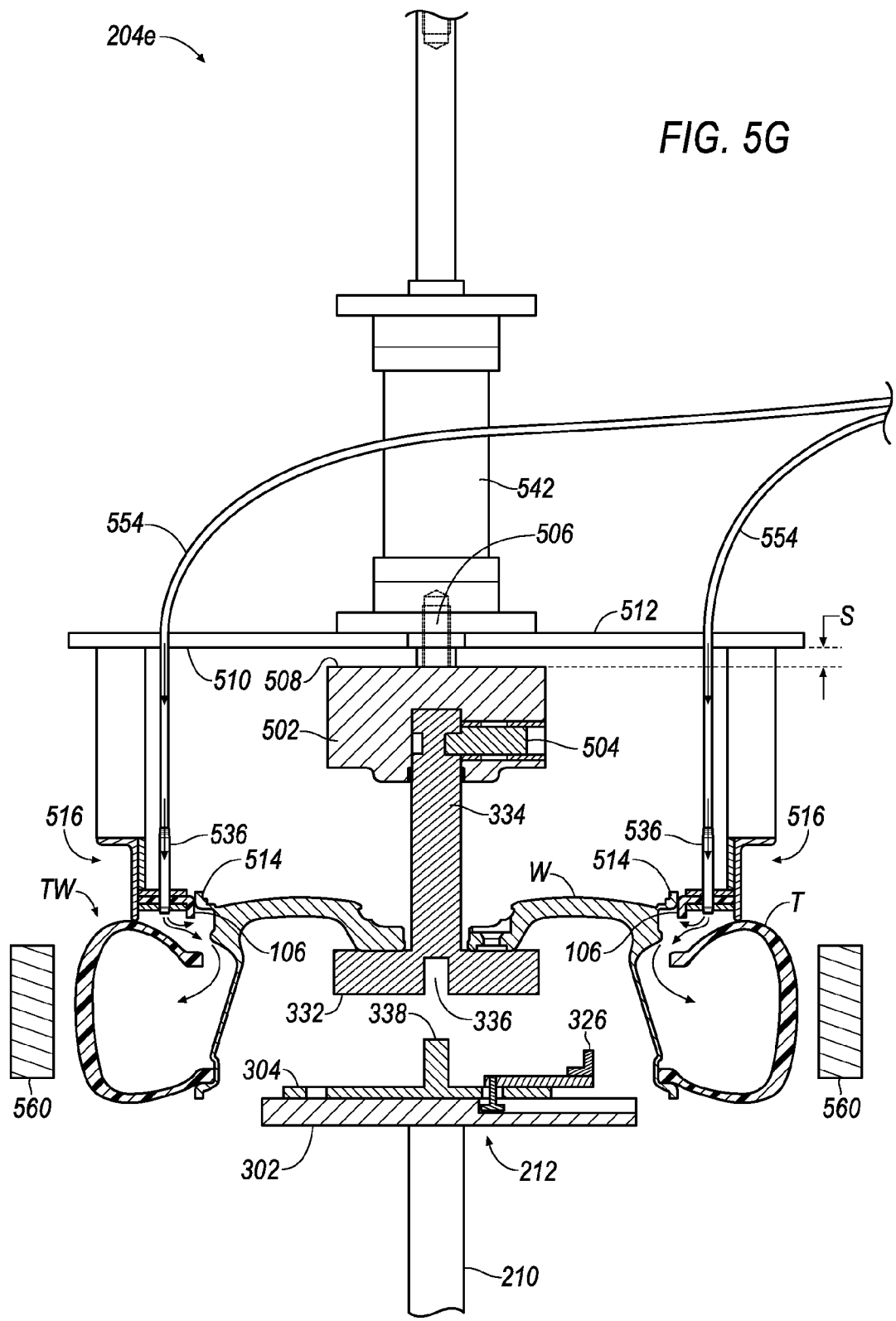
Figure 5H:
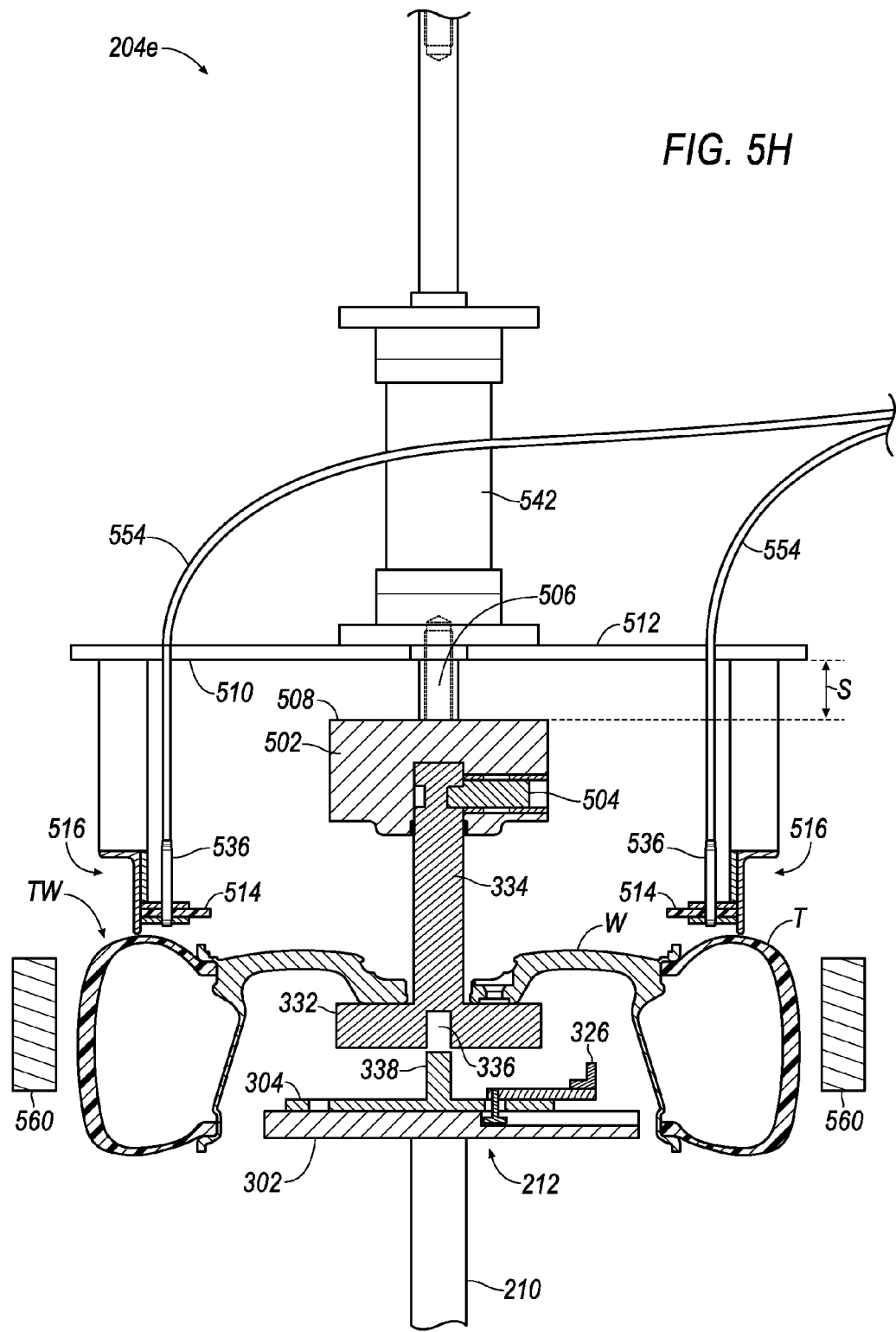
Figure 5I:
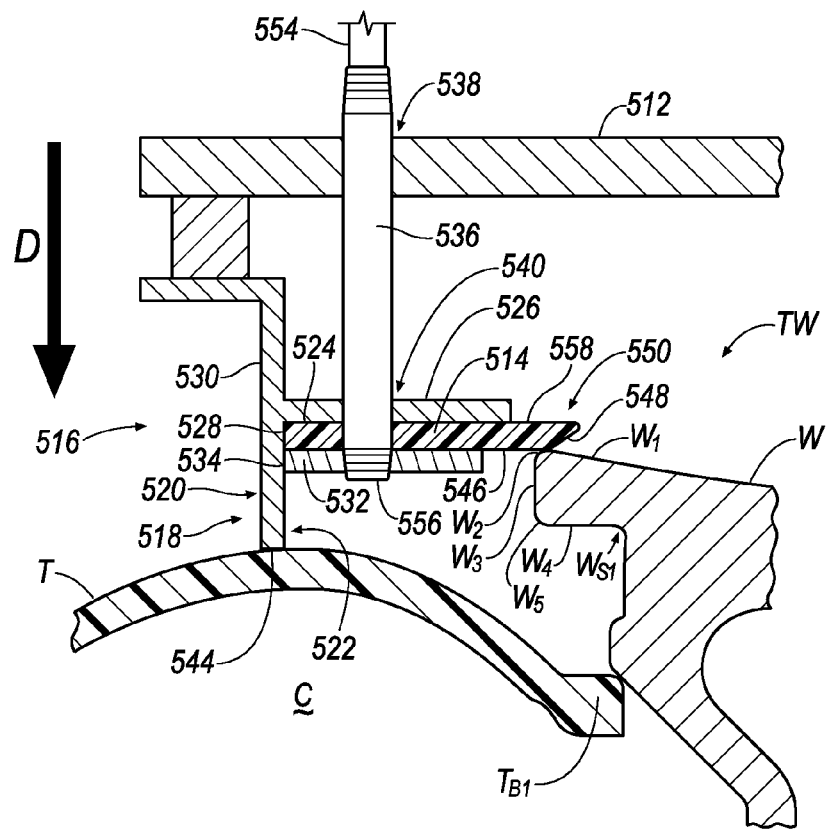
Figure 5J:
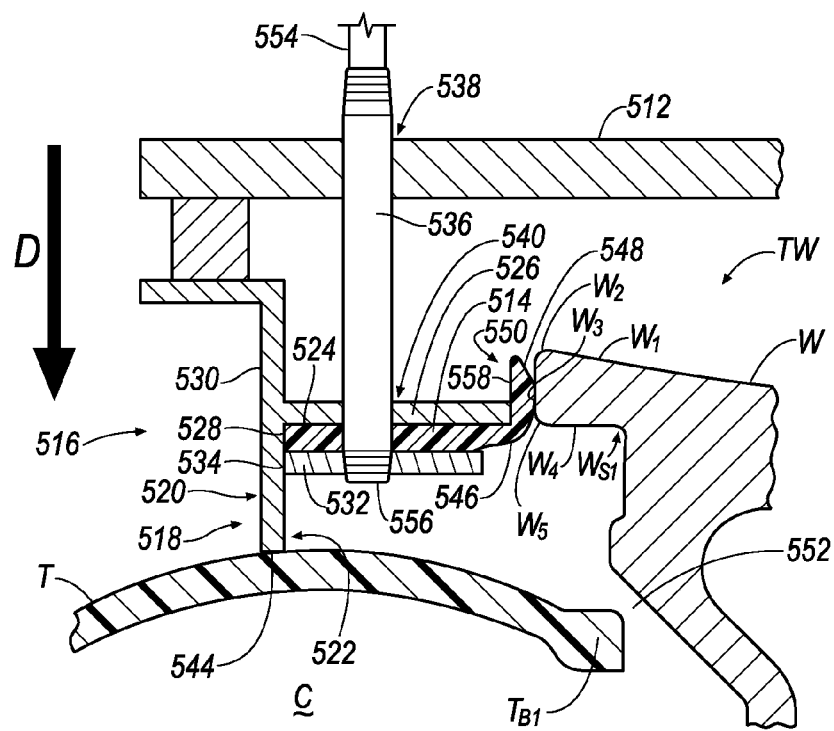

Referring now to FIGS. 5C-5N, a method for inflating the tire-wheel assembly, TW, using the one or more inflators 536 is described according to an embodiment. First, as shown in FIGS. 5C, 5D and 5I, 5J, the spacing, S, is further reduced such that the an inboard side 546, and subsequently, an inner periphery side portion 548 of the flip seal 514 slides over an outboard corner, $W_2$, of the wheel bead seat, $W_{S1}$, which then causes, as shown in FIG. 5J, the inboard side 546 of the flip seal 514 to engage a portion of a circumferential perimeter, $W_3$, f the wheel bead seat, $W_{S1}$. Accordingly, in this orientation, a flexible inner periphery 550 of the flip seal 514 is "flipped" to move the flip seal 514 to a substantially L-shaped cross-sectional position of orientation (according to the view of FIG. 5J). Concurrently, the circumferential end 544 of the rim portion 530 causes the first tire bead, $T_{B1}$, to move away from the first wheel bead seat, $W_{B1}$, to provide the open air passageway 552 therebetween.

Figure 5K:
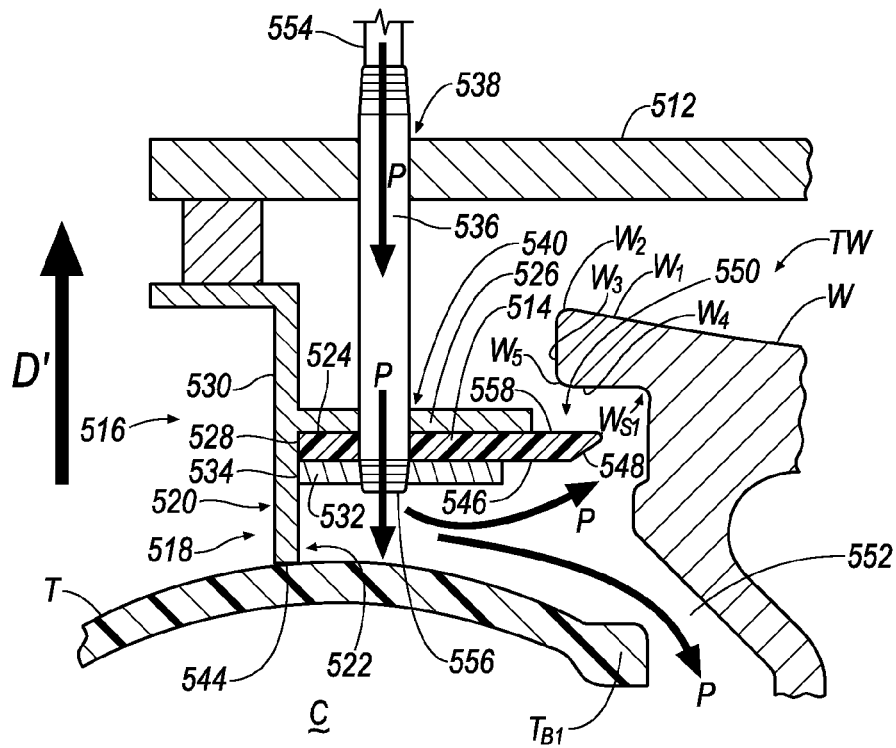

Once the flexible inner periphery 550 of the flip seal 514 is advanced past the circumferential perimeter, $W_3$, of the first wheel bead seat, $W_{S1}$, in the direction of the arrow, D, the flip seal 514 is resiliently moved from the "flipped" position of FIG. 5J to an at-rest position, as shown in FIGS. 5E and 5K. As shown in FIG. 5F, pressurized fluid, P, is fed through the one or more hoses 554 and out of one or more nozzles 556 of the one or more inflators 536 to commence a quick-inflating technique for inflating the tire, T, through the open air passageway 552 provided by the positioning of the circumferential end 544 of the rim portion 530 against the tire, T. It will be appreciated that the pressurized fluid, P, may be fed through the one or more hoses 554 before, during, or after the positioning of the flip seal 514 relative the tire-wheel assembly, TW, shown in FIG. 5K (i.e. pressurized fluid, P, may be fed through the one or more hoses 554 at any time as shown in FIGS. 5I and 5J). It will be appreciated that the pressurized fluid, P, may include any desirable fluid, such as, for example, air, nitrogen, or the like.

Figure 5L:
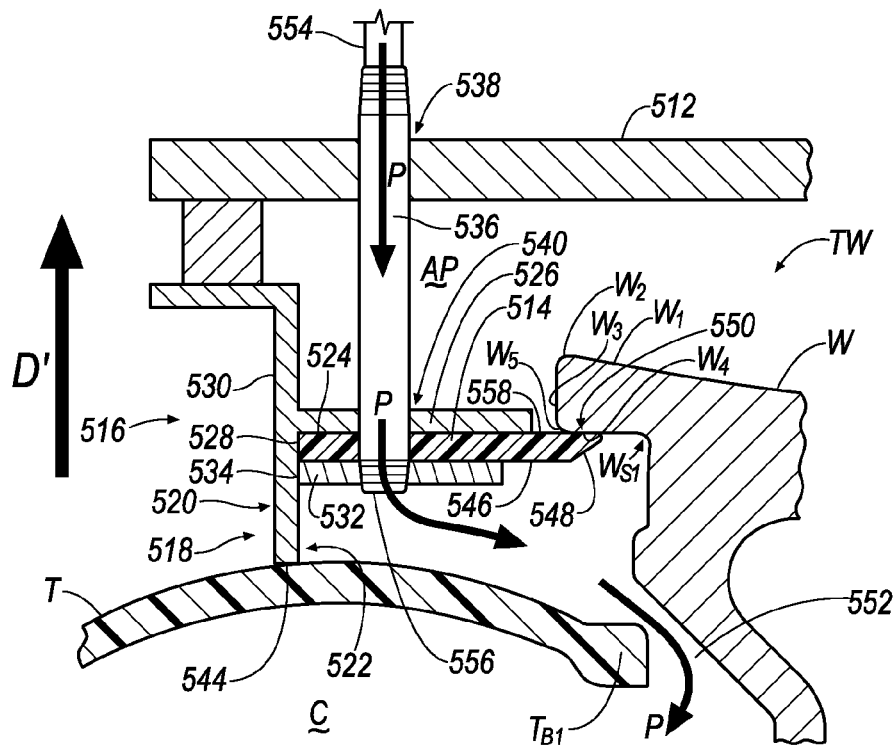

As seen in FIG. 5K, once the flexible inner periphery 550 of the flip seal 514 is advanced past the circumferential perimeter, $W_3$, of the wheel bead seat, $W_{S1}$, as described above, the spacing, S, may be increased to move the inflators 536 and flip seal 514 in a direction according to the arrow, D', that is opposite the direction of the arrow, D. Accordingly, as seen in FIGS. 5F and 5L, as the flip seal 514 is advanced toward the circumferential perimeter, $W_3$, of the first wheel bead seat, $W_{S1}$, in the direction of the arrow, D', an outboard side 558 of the flip seal 514 engages an inboard surface, $W_4$, of the first wheel bead seat, $W_{S1}$. It will be appreciated that the tire, T, is rapidly and substantially inflated when the flip seal 514 is positioned in the orientation as shown in FIG. 5L due to the fact that the flip seal 514 seals the tire-wheel assembly, TW, from ambient air pressure, AP. Depending on the number of inflators 536 utilized, it may take as little as approximately 1 to 5 seconds to pressurize the tire, T, with the pressurized fluid, P.

Figure 5M:
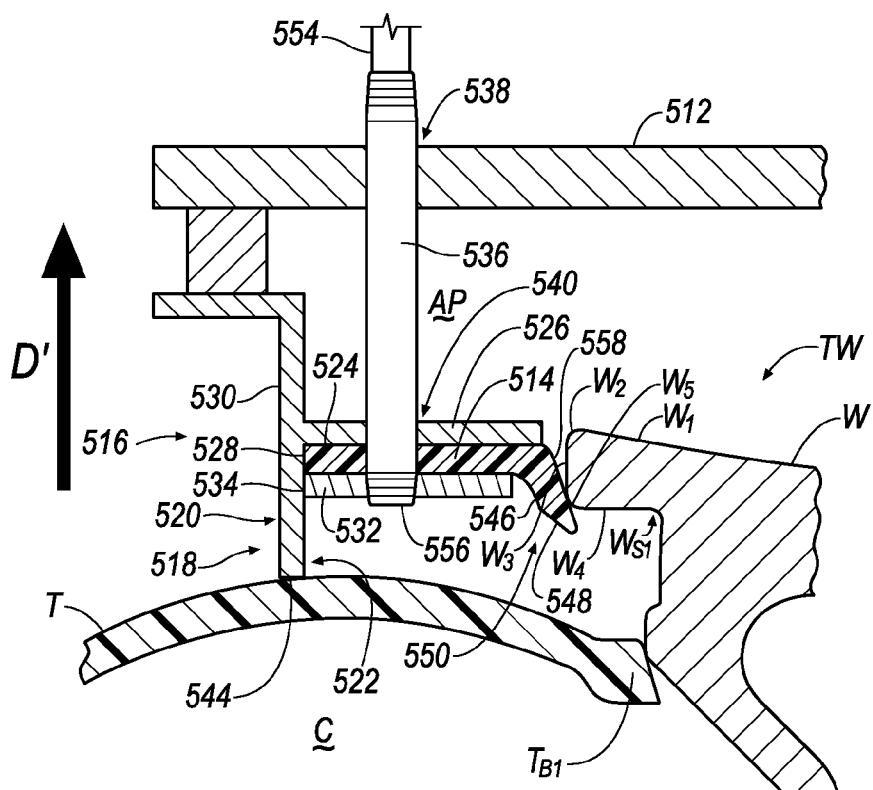

Then, as seen in FIGS. 5G and 5M, as the spacing, S, continues to be increased, the one or more inflators 536 and flip seal 514 move in the direction of the arrow, D', such that the outboard side 558 of the flip seal 514 slides over an inboard corner, $W_5$, of the first wheel bead seat, $W_{S1}$, which then causes the outboard side 558 of the flip seal 514 to engage a portion of the circumferential perimeter, $W_3$, of the first wheel bead seat, $W_{S1}$. Accordingly, in this orientation, the flexible inner periphery 550 of the flip seal 514 is forced into a substantially inverted L-shaped cross-sectional position of orientation (according to the view of FIG. 5M). The lowered position of flip seal 514 in FIG. 5M is substantially the opposite of the raised position of the flip seal 514 as shown in FIG. 5J Concurrently, with the assistance of the pressurized fluid, P, in a circumferential cavity, C, of the tire, T, the circumferential end 544 of the rim portion 530 is moved away from the first tire bead, $T_{B1}$, so as to allow the pressurized fluid, P, in the circumferential cavity, C, of the tire, T, to close off the open air passageway 552 and cause the first tire bead, $T_{B1}$, to seat itself in the wheel bead seat, $W_{B1}$.

Figure 5N:
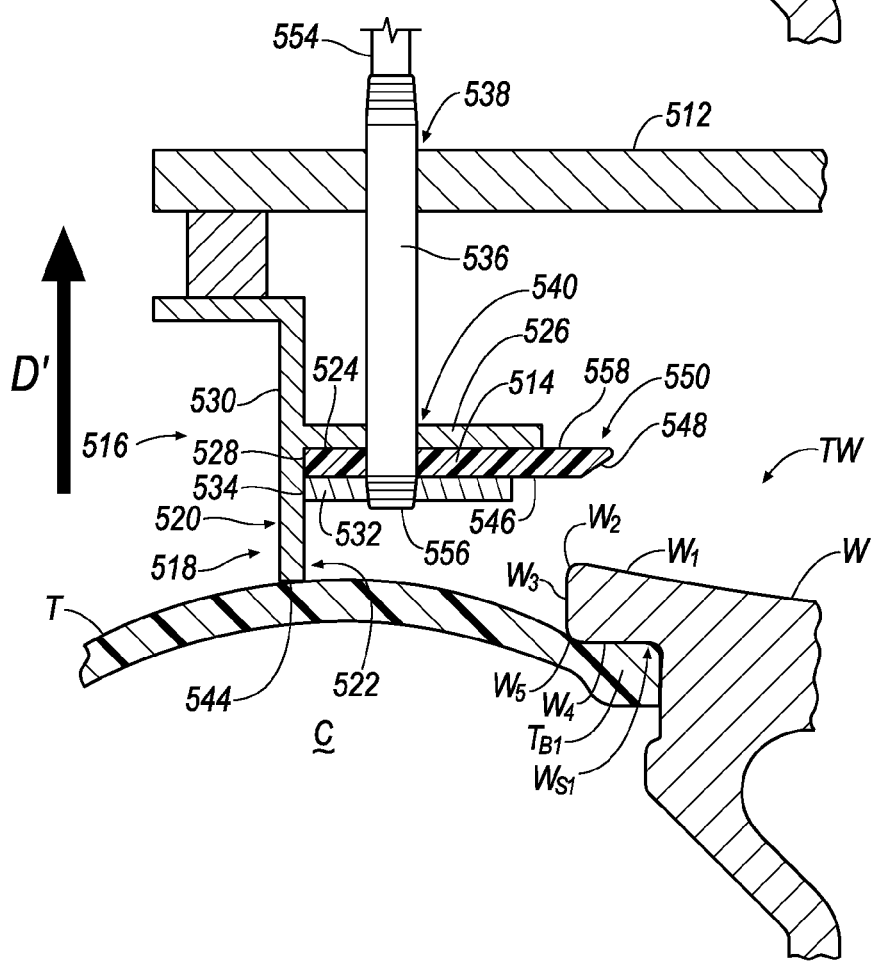

As the spacing, S, continues to be increased such that the one or more inflators 536 and flip seal 514 move in the direction of the arrow, D', the outboard side 558, and subsequently, the inner periphery side portion 548 of the flip seal 514 slides over the outboard corner, $W_2$, of the wheel bead seat, $W_{S1}$, which then causes, as shown in FIGS. 5H and 5N, the flexible inner periphery 550 of the flip seal 514 to resiliently move from the lowered position of FIG. 5M to an at-rest position similar to that as shown in FIG. 5I.

It will be appreciated that the supplying of the pressurized fluid, P, from the one or more nozzles 546 may be ceased before, during, or after a time when the one or more inflators 536 and flip seal 514 are positioned in a manner relative the tire-wheel assembly, TW, as shown in FIG. 5M. If pressurized fluid, P, is still being provided from the one or more nozzles 556, the pressurized fluid, P, may be utilized alone, or, in combination with the change in spacing, S, to push the one or more inflators 536 and flip seal 514 in the direction of the arrow, D', and away from the tire-wheel assembly, TW, once the open air passageway 552 is closed off as described above.

Figure 5O:
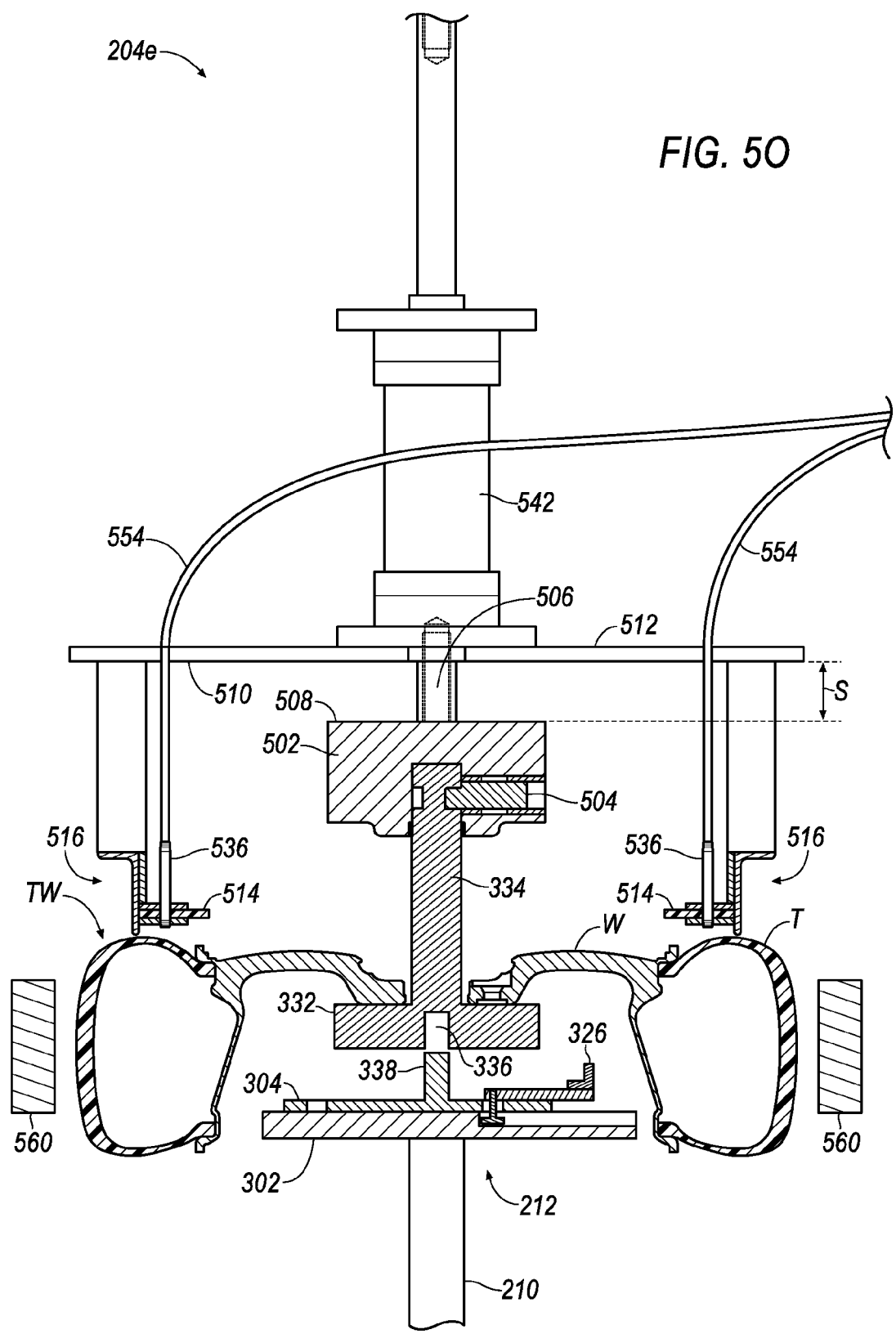

Referring now to FIG. 5O, once the inflating operation is completed such that the tire-wheel assembly, TW, is inflated, the arm portion 210 locates the coupling portion 338 within the recess 336 of the plate 332 such that the detachable portion 330 is reconnected to the rotatable portion 304.

Figure 5P:
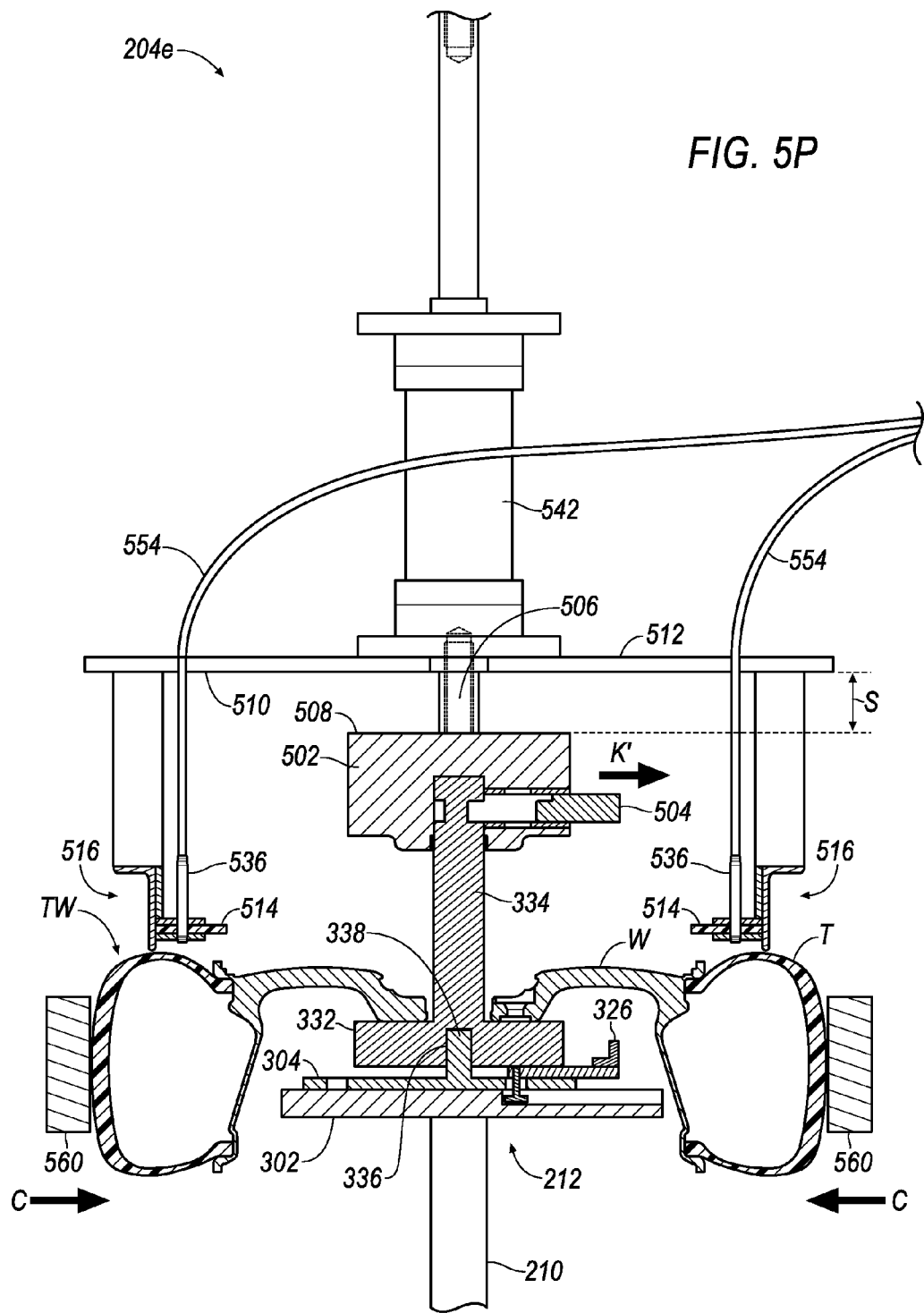

Then, as seen in FIG. 5P, once detachable portion 330 and the rotatable portion 304 are reconnected, clamping portions 560 of the inflating sub-station 204e radially engage the tread surface of the tire, T, according to the direction of the arrow, C. Subsequent to or concurrent with the clamping, C, of the tread surface of the tire, T, the one or more keys 504 is/are moved radially outwardly in the direction of arrow, K', and is/are radially disengaged with the center-pull arm 334.

Figure 5Q:
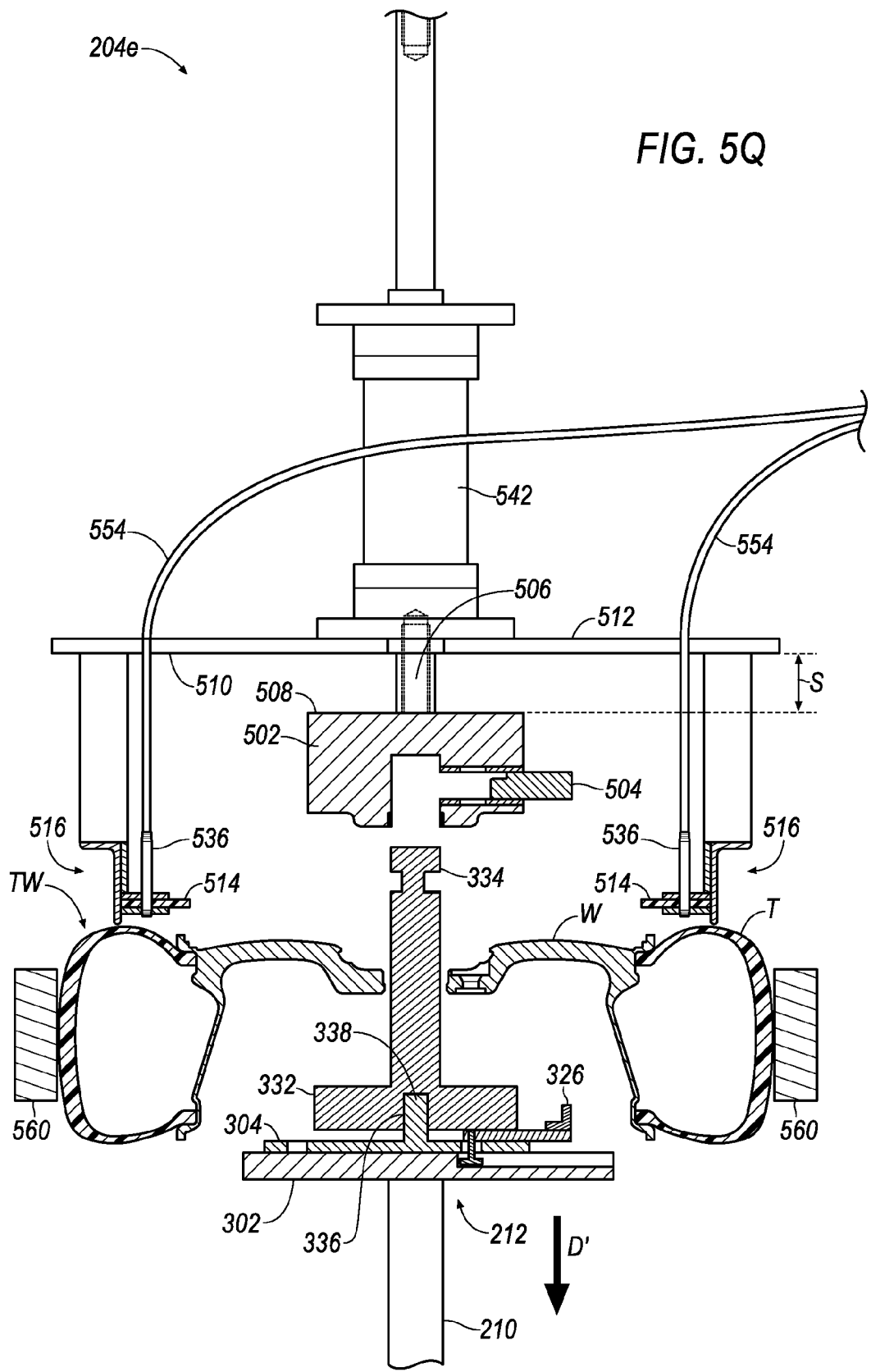

Then, as seen in FIG. 5Q, once the one or more keys 504 is radially disengaged from the center-pull arm 334, the arm portion 210 and claw portion 212 are cycled away from the inflating sub-station 204e in the direction of arrow, D', such that the arm portion 210 and claw portion 212 are cycled to a position substantially similar to the at-rest, idle position of FIG. 2A, ready for receiving a wheel, W, in a subsequent assembling operation.

Referring to FIG. 5R, once the arm portion 210 and claw portion 212 are cycled away from the inflating sub-station 204e, according to the direction of the arrow, D', the clamping portions 560 shuttle the inflated tire-wheel assembly, TW, downward in the direction of the arrow, D', to a finishing sub-station 204f.

Figure 2F:
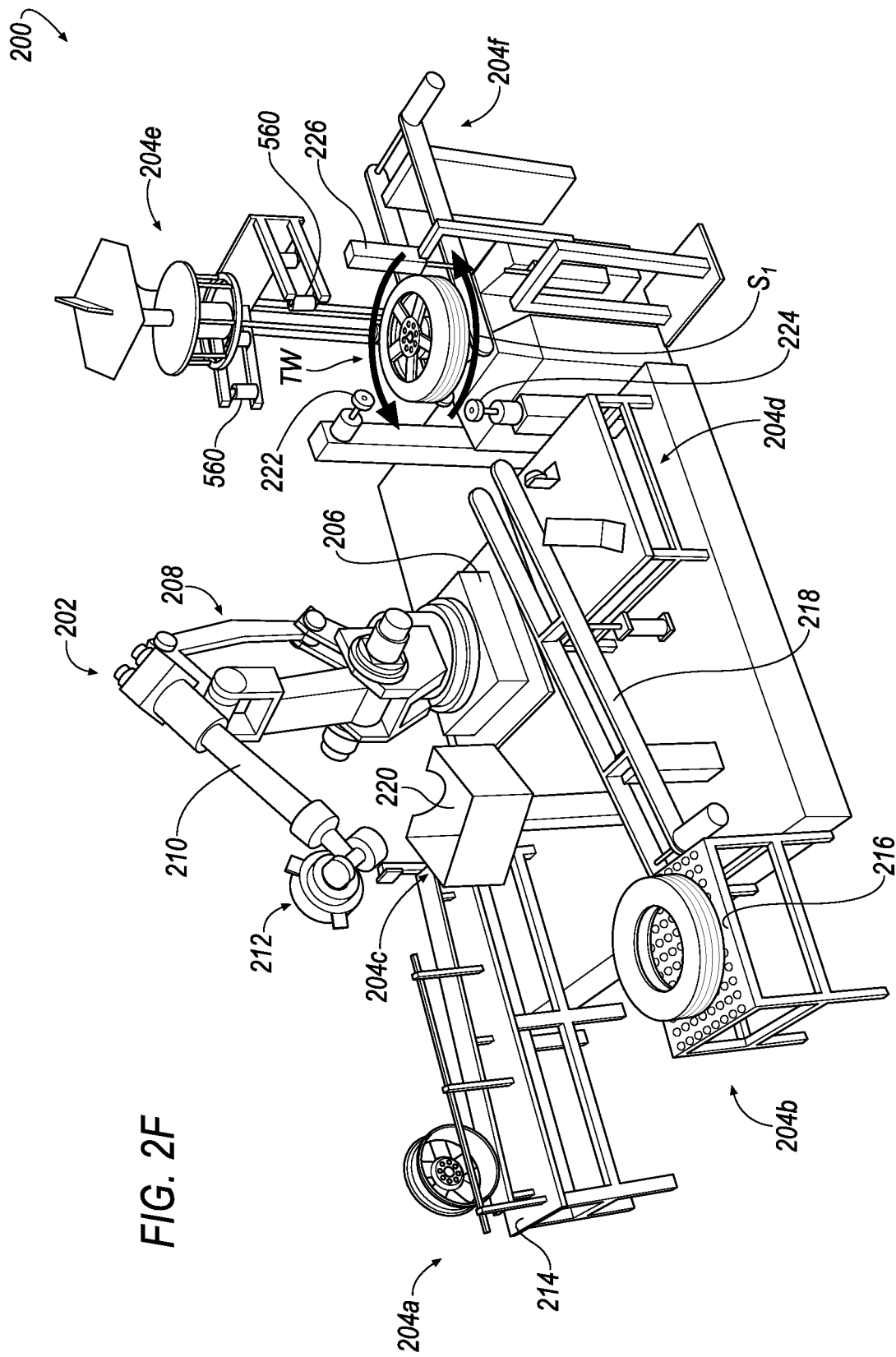

Referencing FIGS. 5R and 2F, the movement of the tire-wheel assembly, TW, relative the inflating sub-station 204e to the finishing sub-station 204f is generally a vertical movement. Once the inflated tire-wheel assembly, TW, has been shuttled to the finishing sub-station 204f, the clamping portions 560 disengages the tread surface of the tire, T, such that the clamping portions 560 are returned vertically upward to the inflating sub-station 204e such that the clamping portions 560 are ready to receive another non-inflated tire-wheel assembly, TW, in a subsequent assembling operation.

Referring to FIG. 2F, once the inflated tire-wheel assembly, TW, is provided at the finishing sub-station 204f, the tire-wheel assembly, TW, is spun, $S_1$, to conduct a compliance test to match the compliance of inflated tire, T, due to unique tread resistances of similarly molded tires, T.

Figure 2G:
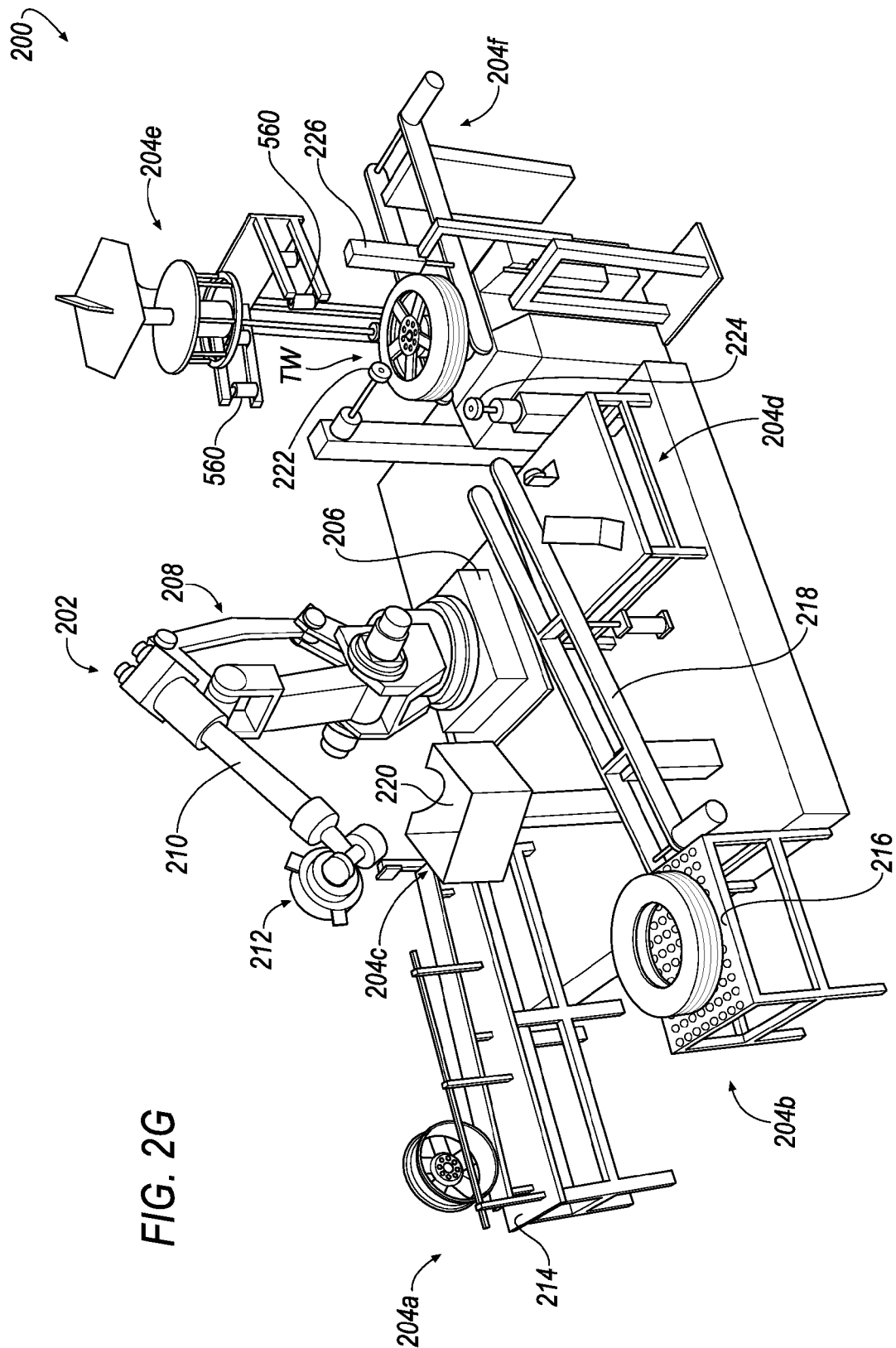

Then, as seen at FIG. 2G, a wobble wheel 222 is engaged with an axial end surface of the tire, T, to remove potentially trapped air bubbles, contaminates and the like that may be located between a tire bead of the tire, T, and a bead seat of the wheel, W. The removing of trapped air bubbles, contaminates and the like may be referred to as "bleeding" or "burping."

Figure 2H:
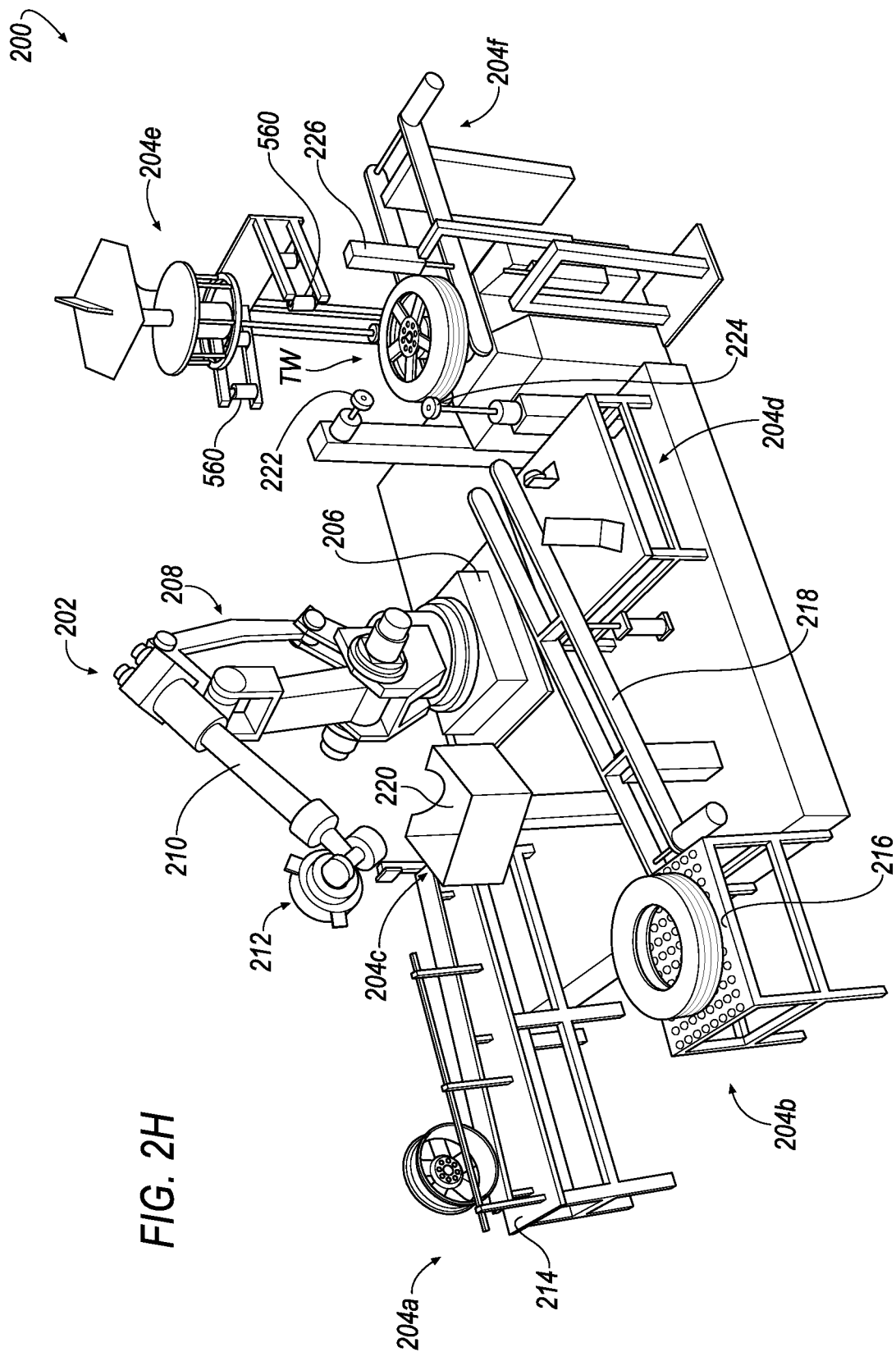

Referring to FIG. 2H, the inflated tire-wheel assembly, TW, is spun by engaging a wobble wheel 224 with a radial, tread surface of the tire, T, to conduct a balancing test to determine the location and amount of weight to be added to the rim of the wheel, W.

Figure 2I:
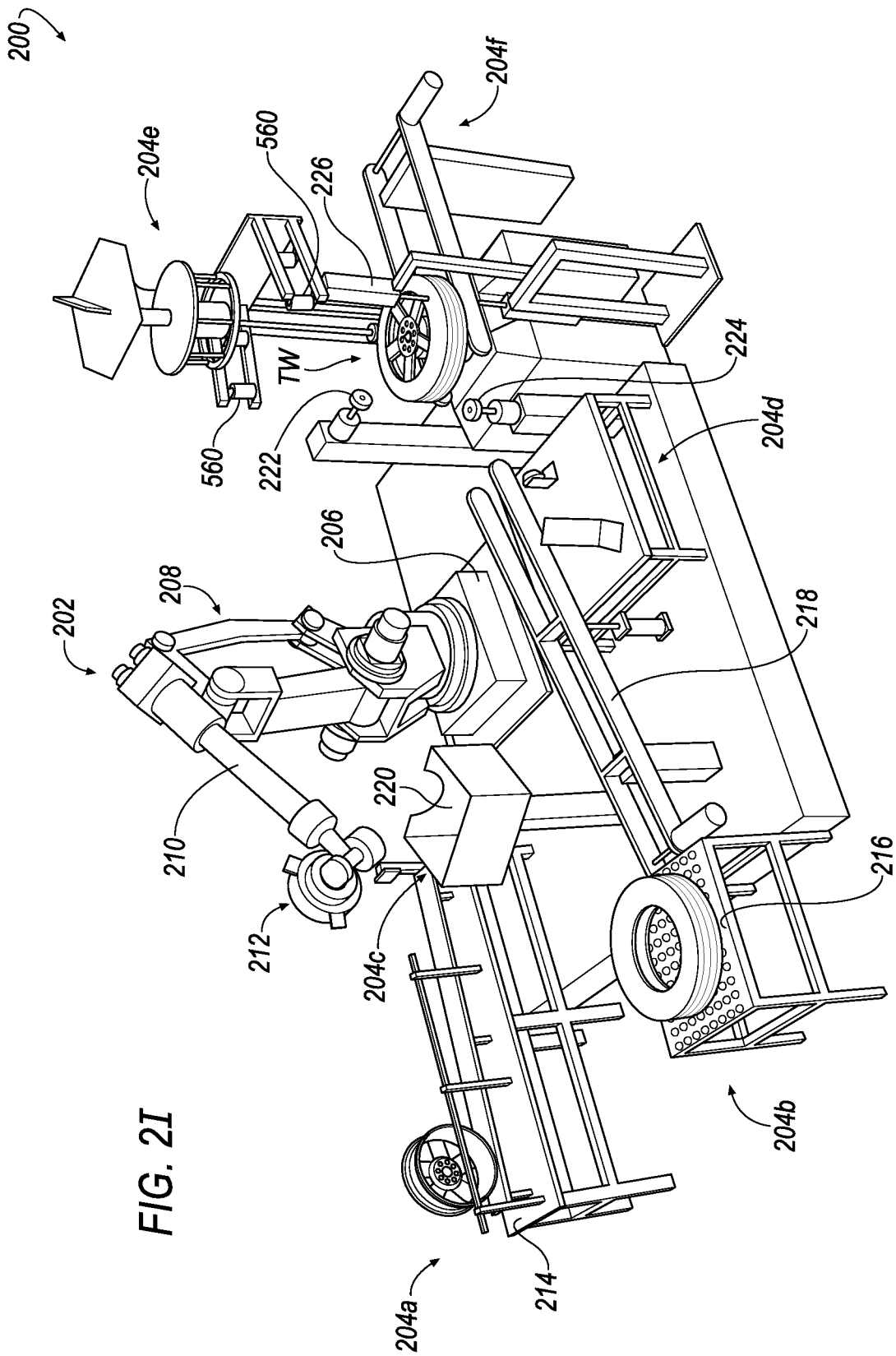

Then, as seen in FIG. 2I, a marking device 226 engages an axial end surface of the tire, T, to provide a mark on the tire, T, to identify the location of weight (not shown) to be added to the rim of the wheel, W. The mark provided on the axial end surface of the tire, T, may include, for example a code, number, or the like that is related to an amount of weight to be added to the rim of the wheel, W, proximate the marked location.

Figure 2J:
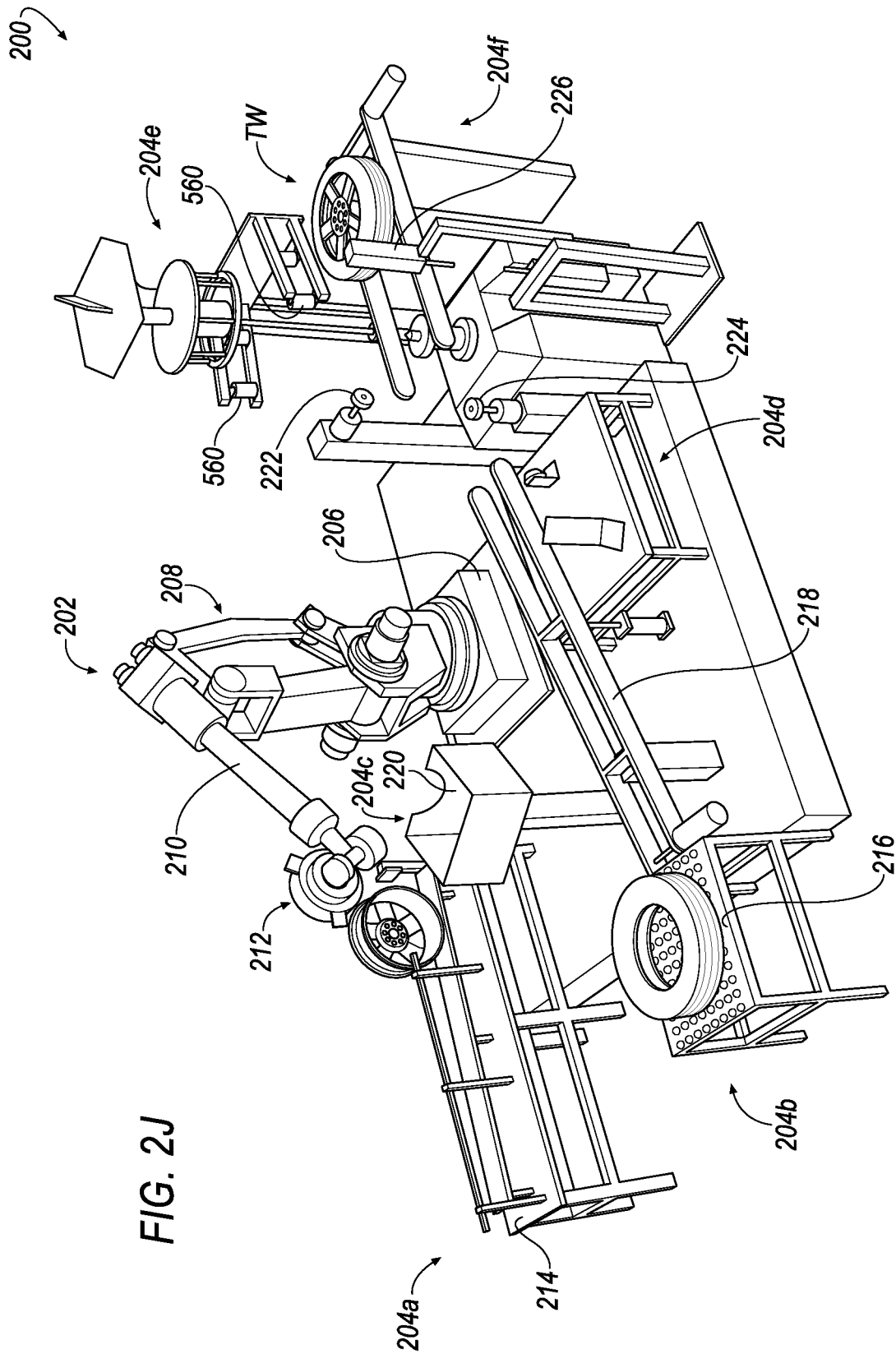

As shown in FIG. 2J, once the tire, T, is marked as shown in FIG. 2J, the processed tire-wheel assembly, TW, is removed from the single-cell workstation 200.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. For example most embodiments shown herein depict engaging a wheel (by way of a robotic arm) and manipulating the wheel to mount a tire thereon. However, nothing herein shall be construed to limit the scope of the present invention to only manipulating a wheel to mount a tire thereon. Specifically the teaching of the present invention also enables one skilled in the art to practice the invention by engaging a tire (by way of a robotic arm), and manipulating the tire to mount the wheel thereon. The exemplary embodiments are merely illustrative and should not be considered restrictive in any way. The scope of the invention is defined by the appended claims and their equivalents, rather than by the preceding description.

What is claimed is:

1. A method for assembling a tire and a wheel, comprising the steps of:
providing a single-cell workstation including: a robotic device and a plurality of sub-stations;
releasably-coupling the robotic device to a wheel at a coupling sub-station of the plurality of sub-stations;
moving the wheel to each of the other plurality of sub-stations according to movements of the robotic device; and
joining a tire to the wheel by performing an assembly operation at one sub-station of the plurality of sub-stations without releasing the wheel from the robotic device, wherein the moving step further comprising the steps of:
moving the wheel to a tire and wheel mounting sub-station of the plurality of sub-stations and mounting the tire to the wheel, wherein the mounting step further comprises:
rotating the wheel and claw portion about a first axis, wherein the first axis is not co-axial with a second axis that extends through the center of the arm and the tire, wherein the first axis and the second axis intersect;
plunging the wheel toward the tire; and
providing a helical angle of approach of the wheel with respect to the tire by preventing the first axis from rotating about the second axis at the intersection of the first and second axes.

2. The method according to claim 1, wherein the releasably-coupling the robotic device to the wheel includes the steps of:
moving an arm of the robotic device proximate the wheel;
positioning a claw portion connected to the arm proximate an inner diameter of the wheel; and
engaging the inner diameter of the wheel with the claw portion.

3. The method according to claim 1, wherein the moving step further comprising the step of:
moving the wheel to a lubricating sub-station of the plurality of sub-stations prior to the step of moving the wheel to the tire and wheel mounting sub-station; and
lubricating at least a portion of the wheel.

4. A method for assembling a tire and a wheel, comprising the steps of:
providing a single-cell workstation including: a robotic device and a plurality of sub-stations;
releasably-coupling the robotic device to a wheel at a coupling sub-station of the plurality of sub-stations;
moving the wheel to each of the other plurality of sub-stations according to movements of the robotic device;
joining a tire to the wheel by performing an assembly operation at one sub-station of the plurality of sub-stations without releasing the wheel from the robotic device, wherein the moving step further comprising the steps of:
moving the wheel to a tire and wheel mounting sub-station of the plurality of sub-stations;
and mounting the tire to the wheel, wherein the mounting step further comprises:
rotating the wheel and claw portion about a first axis, wherein the first axis is not co-axial with a second axis that extends through the center of the arm and the tire, wherein the first axis and the second axis intersect;
plunging the wheel toward the tire; and
providing a precessional angle of approach of the wheel with respect to the tire by rotating the first axis about the second axis at the point of intersection of the first and second axes.

5. The method according to claim 4, wherein the moving step further comprising the step of:
moving the wheel to a lubricating sub-station of the plurality of sub-stations prior to the step of moving the wheel to the tire and wheel mounting sub-station; and
lubricating at least a portion of the wheel.

6. A method for assembling a tire and a wheel, comprising the steps of:
providing a single-cell workstation including: a robotic device and a plurality of sub-stations;
releasably-coupling the robotic device to a wheel at a coupling sub-station of the plurality of sub-stations;
moving the wheel to each of the other plurality of sub-stations according to movements of the robotic device;

joining a tire to the wheel by performing an assembly operation at one sub-station of the plurality of sub-stations without releasing the wheel from the robotic device, wherein the moving step further comprising the steps of:

moving the wheel to a tire inflating sub-station of the plurality of sub-stations; and inflating the tire mounted to the wheel, wherein prior to the inflating step, the moving the wheel to a tire inflating sub-station step further comprises the steps of:

axially supporting the wheel with a detachable portion that is releasably-connected to the claw portion;

radially locking the detachable portion with the tire inflating sub-station; and axially disconnecting the detachable portion from the claw potion.

7. The method according to claim 6, wherein, after the inflating step is performed, Further comprising the steps of:

axially connecting the claw portion the detaching portion;

radially unlocking the detachable portion from the tire inflating sub-station;

radially clamping the inflated tire and wheel assembly with a tire-tread clamping device; and axially moving the claw portion and arm portion away from the tire inflating sub-station.

8. The method according to claim 6, wherein the moving step further comprising the step of:

moving the wheel to a lubricating sub-station of the plurality of sub-stations prior to the step of moving the wheel to the tire and wheel mounting sub-station; and lubricating at least a portion of the wheel.

\* \* \* \* \*

UNITED STATES PATENT AND TRADEMARK OFFICE
CERTIFICATE OF CORRECTION

| | |
|---|---|
| PATENT NO. | : 8,522,437 B2 |
| APPLICATION NO. | : 13/400044 |
| DATED | : September 3, 2013 |
| INVENTOR(S) | : Lawrence J. Lawson et al. |

Page 1 of 1

It is certified that error appears in the above-identified patent and that said Letters Patent is hereby corrected as shown below:

In the Claims:

At column 13, claim number 7, line number 18, please delete "performed. Further" and insert --performed, further--.

Signed and Sealed this
Twenty-second Day of October, 2013

Teresa Stanek Rea
*Deputy Director of the United States Patent and Trademark Office*